(12) United States Patent
Kemble et al.

(10) Patent No.: US 11,720,970 B2
(45) Date of Patent: Aug. 8, 2023

(54) SYSTEMS AND METHODS FOR PROVIDING AUTOMATED DRIVER EVALUATION FROM MULTIPLE SOURCES

(71) Applicant: SAMBA Safety Inc, Greenwood Springs, CO (US)

(72) Inventors: Patrick Kemble, Greenwood Village, CO (US); Jeremy Miller, Greenwood Village, CO (US); Richard Lacey, Greenwood Village, CO (US)

(73) Assignee: SAMBA Safety, Inc., Greenwood Springs, CO (US)

( * ) Notice: Subject to any disclaimer, the term of this patent is extended or adjusted under 35 U.S.C. 154(b) by 201 days.

(21) Appl. No.: 17/039,585

(22) Filed: Sep. 30, 2020

(65) Prior Publication Data
US 2021/0097623 A1   Apr. 1, 2021

Related U.S. Application Data

(60) Provisional application No. 62/909,064, filed on Oct. 1, 2019.

(51) Int. Cl.
| | |
|---|---|
| *G06Q 40/08* | (2012.01) |
| *G06F 16/9035* | (2019.01) |
| *B60W 40/09* | (2012.01) |
| *G06Q 10/0635* | (2023.01) |

(52) U.S. Cl.
CPC ............. *G06Q 40/08* (2013.01); *B60W 40/09* (2013.01); *G06F 16/9035* (2019.01); *G06Q 10/0635* (2013.01)

(58) Field of Classification Search
None
See application file for complete search history.

(56) References Cited

U.S. PATENT DOCUMENTS

| | | | |
|---|---|---|---|
| 6,714,894 B1* | 3/2004 | Tobey | G06Q 40/00 702/182 |
| 2016/0280230 A1* | 9/2016 | Hsieh | B60K 28/066 |
| 2017/0263120 A1* | 9/2017 | Durie, Jr. | G08G 1/205 |
| 2017/0355377 A1* | 12/2017 | Vijaya Kumar | B60W 50/0098 |
| 2018/0059687 A1* | 3/2018 | Hayes | G05D 1/0217 |
| 2019/0143994 A1* | 5/2019 | Chen | B60W 40/09 340/576 |
| 2020/0334762 A1* | 10/2020 | Carver | G06Q 40/08 |

FOREIGN PATENT DOCUMENTS

WO    WO-2019004935 A1 *   1/2019   ............ G06Q 40/08

* cited by examiner

*Primary Examiner* — Abhishek Vyas
*Assistant Examiner* — Blane A Lickteig
(74) *Attorney, Agent, or Firm* — Spencer Fane LLP

(57) ABSTRACT

Systems and methods herein provide a safety system for ingesting data from disparate, remote databases that include data associated with driver information. The systems normalize the data and decode the data to apply standard forms and formats. Data is then presented in one or more user interfaces having visual indicia indicating the status of the drivers. Further, the systems can monitor for changes to the data and provide alerts should the data change and the risk presented by the driver change.

11 Claims, 23 Drawing Sheets

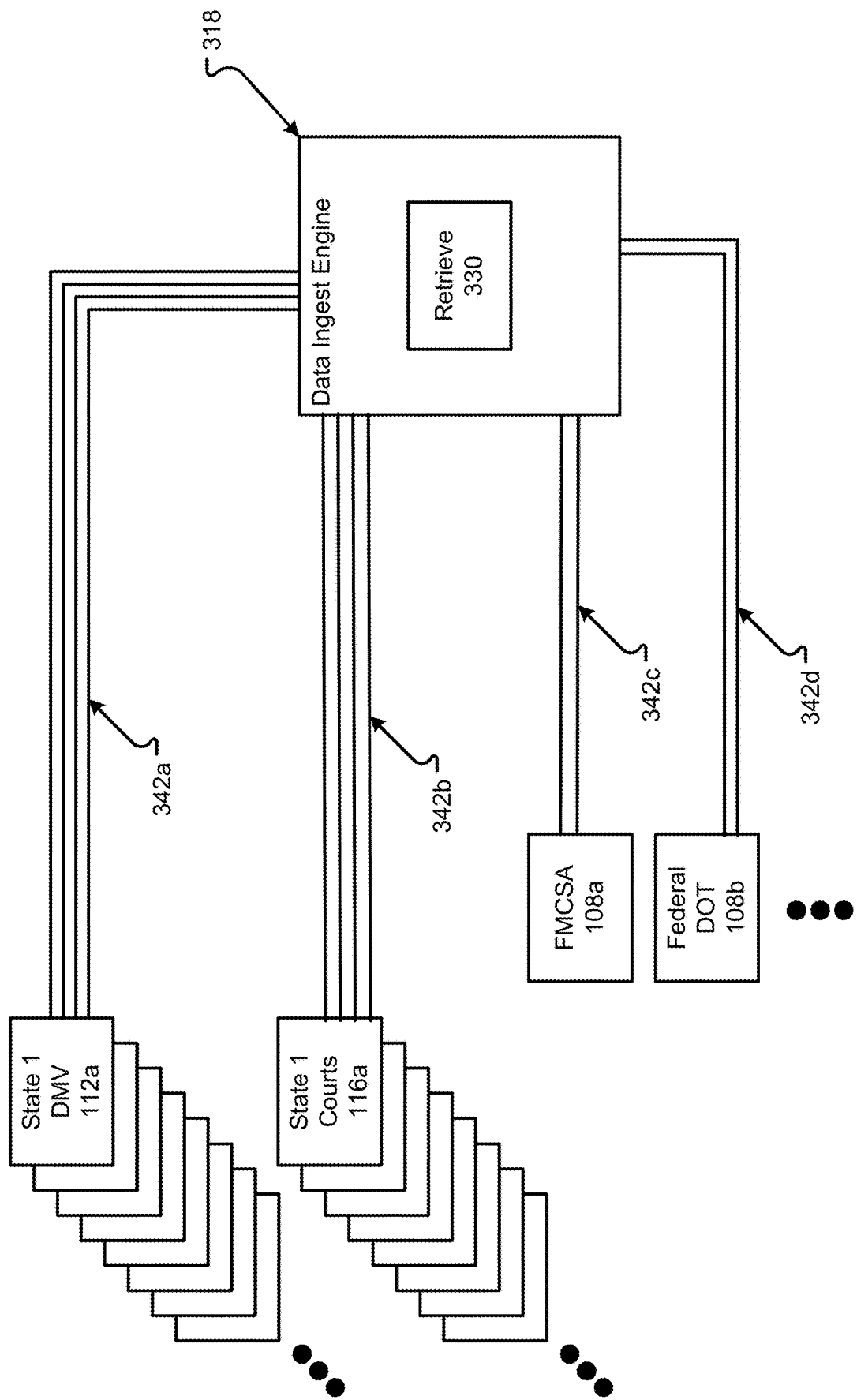

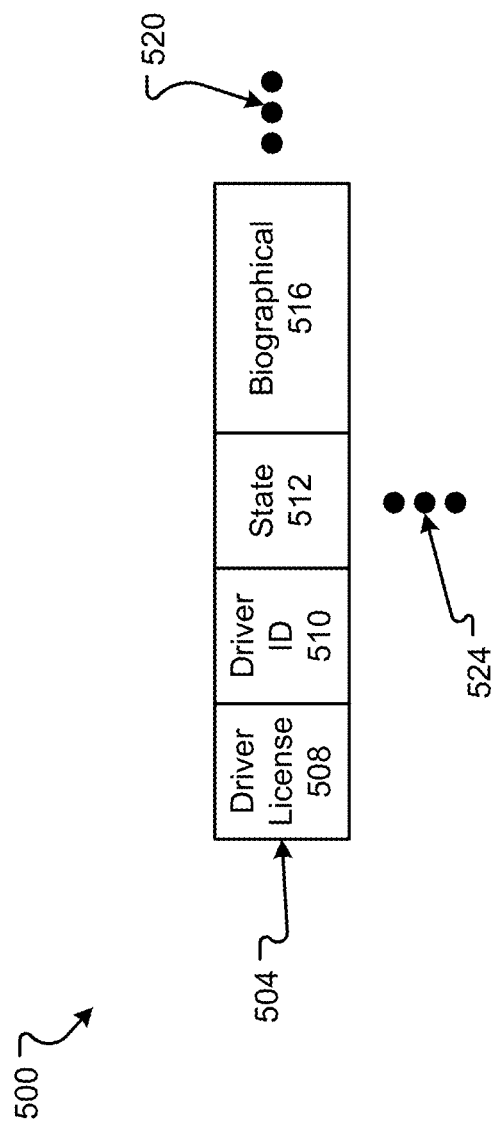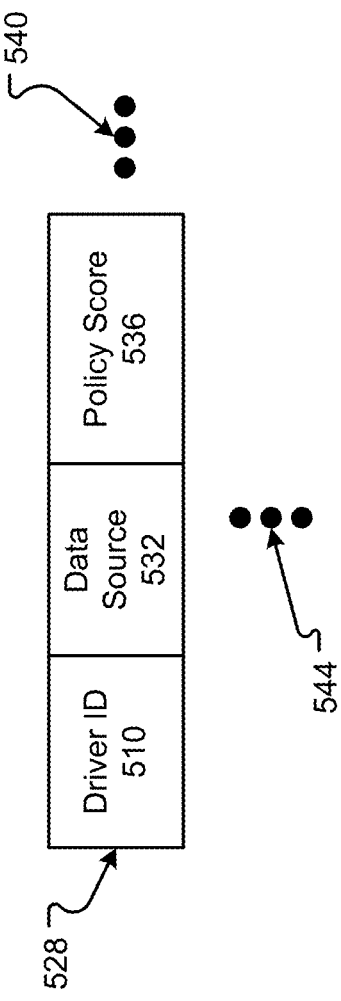
Fig. 5A
Fig. 5B

Fig. 7

Qorta     📞 888-111-2222   ❓ Help

PEOPLE    GROUPS    REPORTS    UPLOADS      🔍    Christine Jean ▽

Policy Score Report

| POLICY SCORE | MVR SCORE | CUSTOM PERSON ID | NAME | STATE LICENSE # | LATEST MVR DATE | LICENSE STATUS | LICENSE EXPIRATION DATE |
|---|---|---|---|---|---|---|---|
| 25 | 20 | 7340 | Mark Johnson | CO 123456789 | 04/22/2019 | Expired | 05/28/2019 |
| 24 | 19 | 3707 | Margie Hamel | NM 123456789 | 04/22/2019 | Active | 01/20/2023 |
| 21 | 14 | 5076 | Jake Edwards | CO 123456789 | 04/22/2019 | Expired | 05/28/2019 |
| 20 | 18 | 5429 | Jonathan Rankle | AL 123456789 | 10/20/2018 | Active | 03/13/2020 |
| 19 | 18 | 1657 | Mark Johnson | MI 123456789 | 04/22/2019 | Active | 12/28/2019 |
| 17 | 13 | 5107 | Margie Hamel | CA 123456789 | 08/01/2019 | Expired | 05/20/2019 |
| 16 | 16 | 6991 | Jake Edwards | FL 123456789 | 04/22/2019 | Suspended | 05/28/2019 |
| 16 | 10 | 7223 | Tom Marson | CA 123456789 | 08/01/2019 | Active | 11/02/2022 |
| 15 | 09 | 5300 | Bill Withers | CA 123456789 | 04/22/2019 | Expired | 05/28/2019 |
| 15 | 00 | 5076 | Jake Edwards | OR 123456789 | 08/01/2019 | Expired | 05/28/2019 |

Fig. 8

Qorta  ☎ 888-111-2222  ⓘ Help    Christine Jean ▽

PEOPLE  GROUPS  REPORTS  UPLOADS

Mark Withers
Status: Active
Custom
Person ID 1234
Groups: Western Region
Bill Code ☐ 210-123-4567
✉ mwithers@harolddelivery.com
⦿ Bend, Oregon PURCHASE MVR
Monitoring: ●ON Driver Score Summary
MVR    CRASH   POLICY
SCORE  SCORE   SCORE®
09  +  06  =  15

License Summary
SSN        *--1234
DOB        01/11/1947
License    CA 112345678
Expires    05/28/2019
License Type  COMMERCIAL

MVR SCORE [09]

CURRENT LIC. STATUS
EXPIRED
LAST MVR: 07/15/2019

VIEW MVR ○  MVR HISTORY ⓘ

0/400

SAVE NOTE

Mark T. Wrote:
06/28/18 18:22
Spoke to him about license expiration and the steps he needs to take to correct it with the state.
Need to review his past MVR's to determine if this is a trend or not

READ ALL NOTES

CSA Summary
DOT# 2 - Harold Delivery

| Inspections | Violations | Crashes | Basic Properties | | | | | |
|---|---|---|---|---|---|---|---|---|
| 6 | 7 | 0 | Unsafe Driving | Controlled Substances | Crash Indicator | HOS Compliance | Driver Fitness | Vehicle Maintenance | HotMot Compliance |
| | | | - | - | - | - | - | 70% | - |

Activity History

| INCIDENT | TYPE | DESCRIPTION | SOURCE | SCORE ⓘ |
|---|---|---|---|---|
| 07/01/2019 | | DRIVER HIT PARKED CAR, AT FAULT | CRASH | 03 |
| 07/01/2019 | ⓘ | ACCIDENT | MVR | -- |
| 06/15/2019 | | | MVR | -- |
| 02/24/2019 | | ACCIDENT, OPERATION OF VEHICLE WHILE INTOXICATED DF | CRASH | 03 |

*Fig. 9*

Qorta  ☎ 888-111-2222 ⓘ Help   PEOPLE   GROUPS   REPORTS   UPLOADS   Christine Jean ▽

Jeff Thomas Crash History
3 Total Claims

| CRASH DATE | CLAIM ID | STATE | INCURRED COST | DESCRIPTION | UPLOADED BY | SCORE |
|---|---|---|---|---|---|---|
| 07/01/2019 | 1287456083 | COLORADO | $592.90 | DRIVER HIT PARKED CAR, AT FAULT | LISA ADMIN | 03 ▫ |
| 02/24/2019 | 1138750972 | UTAH | $1,088.12 | AT FAULT, PREVENTABLE | LISA ADMIN | 03 ▫ |
| 04/12/2017 | 009736485 | CALIFORNIA | $840.45 | DRIVER WAS HIT ON SIDE, NO FAULT | BETTY SMITH | 00 ▫ |

Displaying 1-3

Qorta

ALERTS • PEOPLE  REPORTS  INSIGHT

| | | 1 | 2 | ... | 6 | 7 | > | | Go To Page | 1 | 000TT6TBQJ | GO |

1 - 50 of 341

Alerts
☐ Select Groups

Priority
(Medium ⊗)

Status
(In Progress ⊗)
(New ⊗)

Date
[ Date ]

Type
(Activity MVR ⊗)
(EnrollemntMVR ⊗)
(California EPM ⊗)
(On-Demand MVR ⊗)
(Other MVR ⊗)
(Violation Inspection ⊗)
(DOT Crash ⊗)

Actions
(Missing Driver Copy ⊗)

Search assignees

| | | | |
|---|---|---|---|
| ☐ (New) | New Inspection for Bill Smith | Violation Inspection Pearl District Trans... | 07/08/2014 Bethany Hill |
| ☐ (Medium) | New Inspection Crash for Tom Clayton | Violation Inspection Pearl District Trans... | 06/26/2014 Bethany Hill |
| ☐ (Medium) | New Inspection for Martin Perry | Violation Inspection Pearl District Trans... | 11/21/2015 Bethany Hill |
| ☐ (New) | New Inspection for Jill Harris | Violation Inspection Pearl District Trans... | 03/25/2020 Bethany Hill |
| ☐ (Medium) | New Inspection for Mack Miller | Violation Inspection Pearl District Trans... | 07/30/2019 Bethany Hill |
| ☐ (New) | New Inspection for Bill Bob | Violation Inspection Pearl District Trans... | 06/02/2020 Bethany Hill |
| ☐ (Medium) | New Inspection for Jeffrey Miler | Violation Inspection Pearl District Trans... | 12/18/2017 Bethany Hill Hoyt |
| ☐ (New) | New Inspection for Deb Miller | Violation Inspection Pearl District Trans... | 01/28/2019 Bethany Hill |
| ☐ (Medium) | New Inspection for Bethany Pinkerton | Violation Inspection Pearl District Trans... | 01/02/2020 Bethany Hill |

---

New Inspection
07/30/2019

Driver Name
Jeff Miller

Group
Pearl District Transportation

Details

Violations
• 393.130 - No/improper heavy vehicle/machinery securement

Status          Priority          Assignee
New                 Priority Medium       Bethany Hill  ✕

Actions | Attachments | Notes | Activity

☐ Received Driver Copy

☐ Corrections Verified

☐ Certified & Sent To State

*Fig. 14B*

Inspection Details - 0001622163
Pearl District Transportation (2)

1444

1446

1448

Inspection Information

| | | |
|---|---|---|
| Driver Name | Inspection Date | Inspection Level |
| Miller, Jeff | 06/17/2014 | 2 - Walk Around |
| State License Number | Post Date | Inspection State |
| TN 12345678 | 07/08/2014 | IL |
| DOB | Inspection Start Time | Inspection Location Code |
| | 8:30 AM | ROADSIDE |
| Carrier CSA Points | Inspection End Time | Inspection Duration |
| 0 | 8:53 AM | 0:23 |
| Driver CSA Points | | |
| 0 | | |

| | | |
|---|---|---|
| | | Inspector Name |
| | | Inspector Code |
| | | Post Accident Indicator |
| | | No |
| | | HazMat Type Code |
| | | No |

Violation Information 1450

| BASIC | Violation Code | Description | Observable | Driver Responsible | Severity Weight | OOS | Carrier Points Time Weight | Carrier Points Total Points | Driver Points Time Weight | Driver Points Total Points |
|---|---|---|---|---|---|---|---|---|---|---|
| Vehicle Maintenance | 393.60(c) | Damaged or discolored... | Yes | Y | 1 | | 0 | N/A | 0 | N/A |
| Hours of Service | 395.8(k)(2) | Drier failing t reatain... | No | Y | 5 | +2 | 0 | N/A | 0 | N/A |
| Unsafe Driving | 392.2S | Speeding | Yes | Y | 1 | | 0 | N/A | 0 | N/A |

CLOSE

*Fig. 14C*

SYSTEMS AND METHODS FOR PROVIDING AUTOMATED DRIVER EVALUATION FROM MULTIPLE SOURCES

CROSS-REFERENCE TO RELATED APPLICATION

This application claims priority to and the benefit of U.S. Provisional Patent Application No. 62/909,064, filed on Oct. 1, 2019, entitled "SYSTEMS AND METHODS FOR PROVIDING AUTOMATED DRIVER EVALUATION FROM MULTIPLE SOURCES," which is incorporated herein by reference, in its entirety, for all that it teaches and for all purposes.

FIELD

The present disclosure is generally directed to driver safety systems.

BACKGROUND

Driving a vehicle, in particular, a fleet vehicle, requires drivers that are responsible and safe. Organizations that employ drivers must monitor drivers to limit the organization's litigation risk. To control driver behavior, organizations will enact a driver policy. The driver policy may have one or more rules required of the drivers. These rules can include a minimum number of tickets or infractions. Violations of the driver policy may end the employment of the driver or cause the organization to employ corrective measures to improve the driver's performance. Unfortunately, driver infractions are not always indicative of whether a driver may be safe or unsafe. As such, the organizations are unable to have the most accurate picture of how their fleet drivers are actually impacting that risk.

BRIEF DESCRIPTION OF THE DRAWINGS

FIG. 3C also depicts a hardware/software architecture in accordance with examples of the present disclosure;

FIG. 5A depicts a data structure that can be sent, received, stored, retrieved, etc. in accordance with examples of the present disclosure;

FIG. 5B depicts a data structure that can be sent, received, stored, retrieved, etc. in accordance with examples of the present disclosure;

FIG. 7 depicts a graphical user interface for providing driver and/or organization information in accordance with examples of the present disclosure;

FIG. 8 depicts a graphical user interface for providing driver and/or organization information in accordance with examples of the present disclosure;

FIG. 9 depicts a graphical user interface for providing driver and/or organization information in accordance with examples of the present disclosure;

FIG. 10 depicts a graphical user interface for providing driver and/or organization information in accordance with examples of the present disclosure;

FIG. 14A depicts a graphical user interface for providing driver and/or organization information in accordance with examples of the present disclosure;

FIG. 14B depicts a graphical user interface for providing driver and/or organization information in accordance with examples of the present disclosure;

FIG. 14C depicts a graphical user interface for providing driver and/or organization information in accordance with examples of the present disclosure.

DETAILED DESCRIPTION

Figure 1:
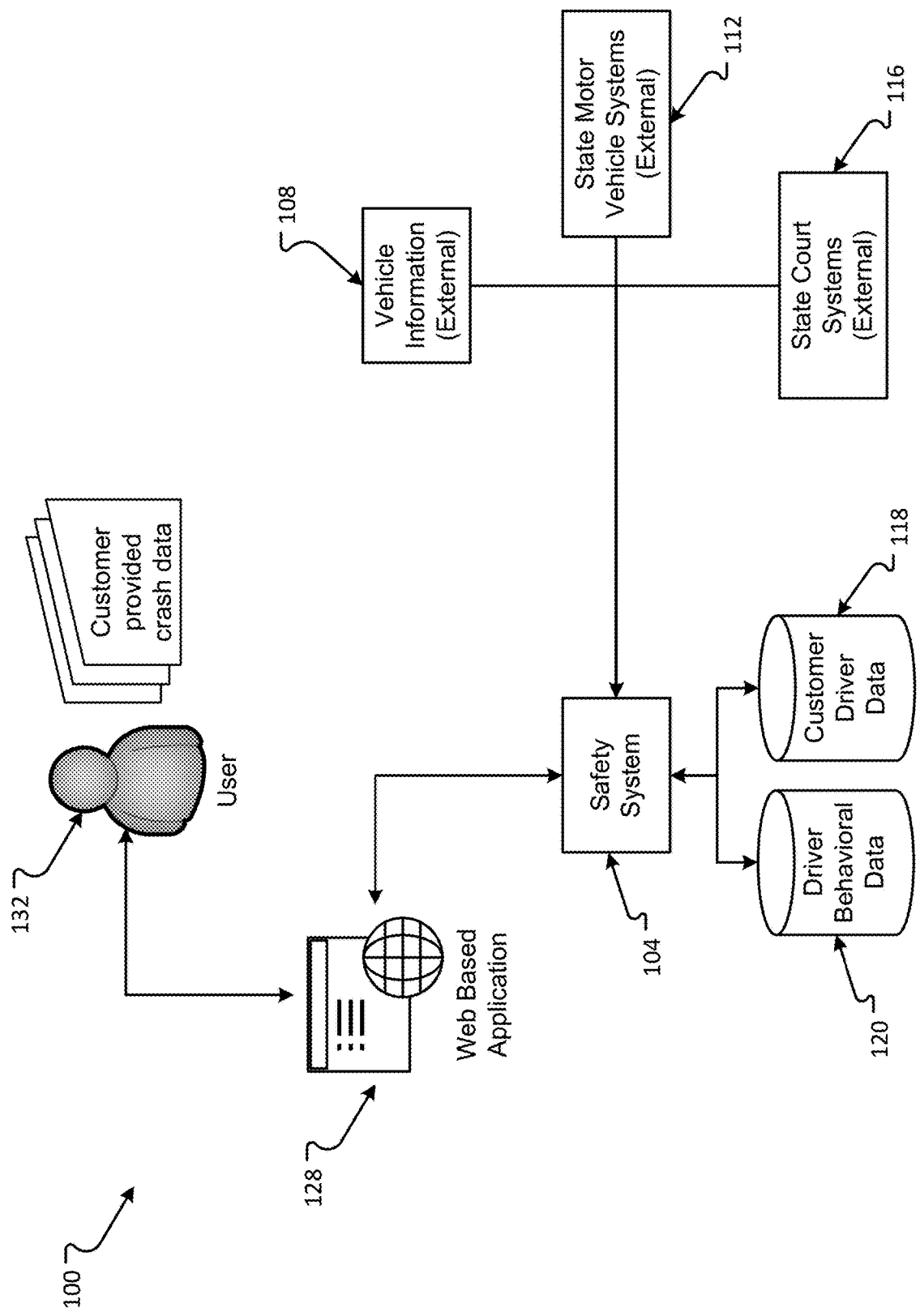
FIG. 1 depicts an environment in accordance with examples of the present disclosure.

An example of an environment 100 where the methods and processes herein may be conducted may be as shown in FIG. 1. The environment 100 can include a safety system 104 that may be in communication, through a network, with a user 132. The user 132 may access the safety system 104 through a web-based application 128. The web application 128 may be a software as a service (SaaS) application that allows the user to access data about fleet drivers. The safety system 104 can include any hardware, software, or hardware and/or software operable to provide the driver information to the user 132. The user 132 can represent a user computer system. Therefore, the user 132 can be hardware, software, or a combination of hardware and software. Devices, components, systems, computers, etc. that may represent the user 132 or safety system 104 may be as shown and described in FIGS. 2A and 2B.

The safety system 104 may also be in communication, through a network, with one or more external sources of information about the drivers. These external information systems can include one or more of, but are not limited to, state motor vehicle systems 112, state court systems 116, and/or other vehicle information systems 108. Each of these systems 112 through 116 can be hardware, software, or combination of hardware software. The systems 112 through 116 may be computers, devices, etc., as described in conjunction with FIGS. 2A and 2B.

The state motor vehicle system 112 can provide traffic ticket, non-moving violation tickets, or other information about the motor vehicle records (MVRs) of the driver. The state court systems 116 may provide any type of information about plea bargains or convictions on tickets or other types of crimes. The vehicle information systems 108 can include other information, for example, information from insurance companies that provide accident information or other claims data that may be useful in determining driver behavior. Other information may also be provided from the other driver or vehicle information systems 108, for example, driver monitoring systems placed and operated in personal or business vehicles.

The safety system 104 may also interact with one or more data stores 118. The data stores 118 can store the information from systems 108 through 116 or customer provided crash data 136, as provided by the user 132 or driver. The customer provided crash data 136 can include any type of crash or other information about a driver employed by the organization and about an accident or other incident that occurred when the user 132 was conducting business for the organization as a driver. This information may be stored in the data stores 118. The data stores 118 may be as described in conjunction with FIGS. 2A and 2B.

The data store 118 can include a portion 120 for storing driver behavior data. Another portion 124 can include customer driver data. The driver behavior data 120 can describe types of ticketing or other information from insurance companies or other organizations that describe how the driver is performing. At least some of this information may be as described in conjunction with FIGS. 5A and 5B. Customer driver data 124 can include information provided by the customer or user 132. This customer driver data 124 can indicate performance of the driver while in employment with the organization. There may be other sources of information not shown in FIG. 1, for example, insurance company records, etc.

Figure 2A:
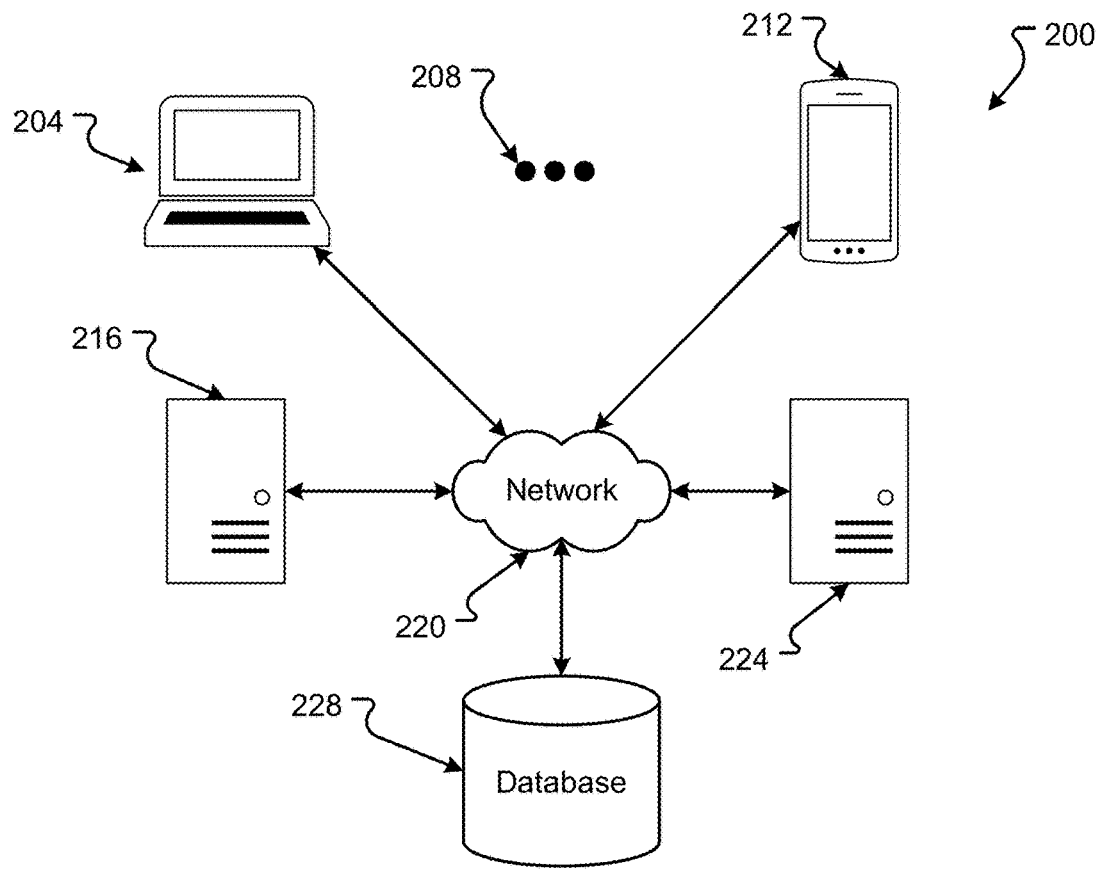
FIG. 2A depicts a computing environment that may include a server, user computer, or other systems provided and described herein, in accordance with examples of the present disclosure.

FIG. 2A shows a computing environment 200 that may include as the servers, user computers, or other systems provided and described herein, in accordance with examples of the present disclosure. The computing environment 200 can include one or more user computers, or computing devices, such as a computing device 204, a communication device 212, and/or other devices, as represented by ellipses 208. The computing devices 204, 212 may include general purpose personal computers (including, merely by way of example, personal computers, and/or laptop computers running various versions of Microsoft Corp.'s Windows®, Google's Android operating system (OS), Linux OS, and/or Apple Corp.'s MacOS or iOS® operating systems) and/or workstation computers running any of a variety of commercially-available UNIX® or UNIX-like operating systems. These computing devices 204 and 212 may also have any of a variety of applications, including for example, database clients and/or server applications, and web browser applications. Alternatively, the computing devices 204 and 212 may be any other electronic device, such as a thin-client computer, Internet-enabled mobile telephone, and/or personal digital assistant, capable of communicating via a network 220 and/or displaying and navigating web pages or other types of electronic documents. Although the exemplary computing environment 200 is shown with two computing devices, any number of user computers or computing devices may be supported.

The computing environment 200 may also include one or more servers 216, 224. The servers 216, 224 may be servers provided in a cloud computing environment, for example, in Amazon® Web Services™ (AWS), Google® Cloud® Platform, Microsoft® Azure®, etc. In this example, server 224 is shown as a web server and server 216 is shown as an application server. The web server 224, which may be used to process requests for web pages or other electronic documents from computing devices 204 and 212. The web server 224 can be running an operating system including any of those discussed above, as well as any commercially-available server operating systems. The web server 224 can also run a variety of server applications, including SIP (Session Initiation Protocol) servers, HTTP(s) servers, FTP servers, CGI servers, database servers, Java servers, and the like. In some instances, the web server 224 may publish operations available operations as one or more web services.

The computing environment 200 may also include one or more file and or/application servers 216, which can, in addition to an operating system, include one or more applications accessible by a client running on one or more of the computing devices 204 and 212. In at least some configurations, the application server 216 can provide data to the computer devices 204 and 212 and receive data from these computer 204 and 212. The server(s) 216 and/or 224 may be one or more general purpose computers capable of executing programs or scripts in response to the computing devices 204 and 212. As one example, the server 216, 224 may execute one or more web applications. The web application may be implemented as one or more scripts or programs written in any programming language, such as Java®, JavaScript, Go, R, Swift, C, C#®, or C++, and/or any scripting language, such as Perl, PHP, Python, or TCL, as well as combinations of any programming/scripting languages. The application server(s) 216 may also include database servers, including without limitation those commercially available from Oracle®, Microsoft®, Sybase®, IBM® and other current or future-developed database technologies, which can process requests from database clients running on a computing device 204, 212.

The web pages created by the server 224 and/or 216 may be forwarded to a computing device 204 and 212 via a web (file) server 216, 224. Similarly, the web server 224 may be able to receive web page requests, web services invocations, and/or input data from a computing device 204 and 212 (e.g., a user computer, etc.) and can forward the web page requests and/or input data to the web (application) server 216. In further examples, the server 216 may function as a file server. Although for ease of description, FIG. 2A illustrates a separate web server 224 and file/application server 216, those skilled in the art will recognize that the functions described with respect to servers 224, 216 may be performed by a single server and/or a plurality of specialized servers, depending on implementation-specific needs and parameters. The computer systems 204 and 212, web (file) server 224 and/or web (application) server 216 may function as the system, devices, or components described in FIGS. 1, 3, 4.

The computing environment 200 may also include a database 228. The database 228 may reside in a variety of locations. By way of example, database 228 may reside on a storage medium local to (and/or resident in) one or more of the computers 204, 212, 216, and 224. Alternatively, it may be remote from any or all of the computers 204, 212, 216, and 224, and in communication (e.g., via the network 220) with one or more of these systems. The database 228 may reside in a storage-area network ("SAN") familiar to those skilled in the art. Similarly, any necessary files for performing the functions attributed to the computers 204, 212, 216, and 224 may be stored locally on the respective computer and/or remotely, as appropriate. The database 228 may be a relational database, such as Oracle 20i®, that is adapted to store, update, and retrieve data in response to SQL-formatted commands. Database 228 may represent databases and/or data stores 216, 218, 220, 222, and/or 224.

Figure 2B:
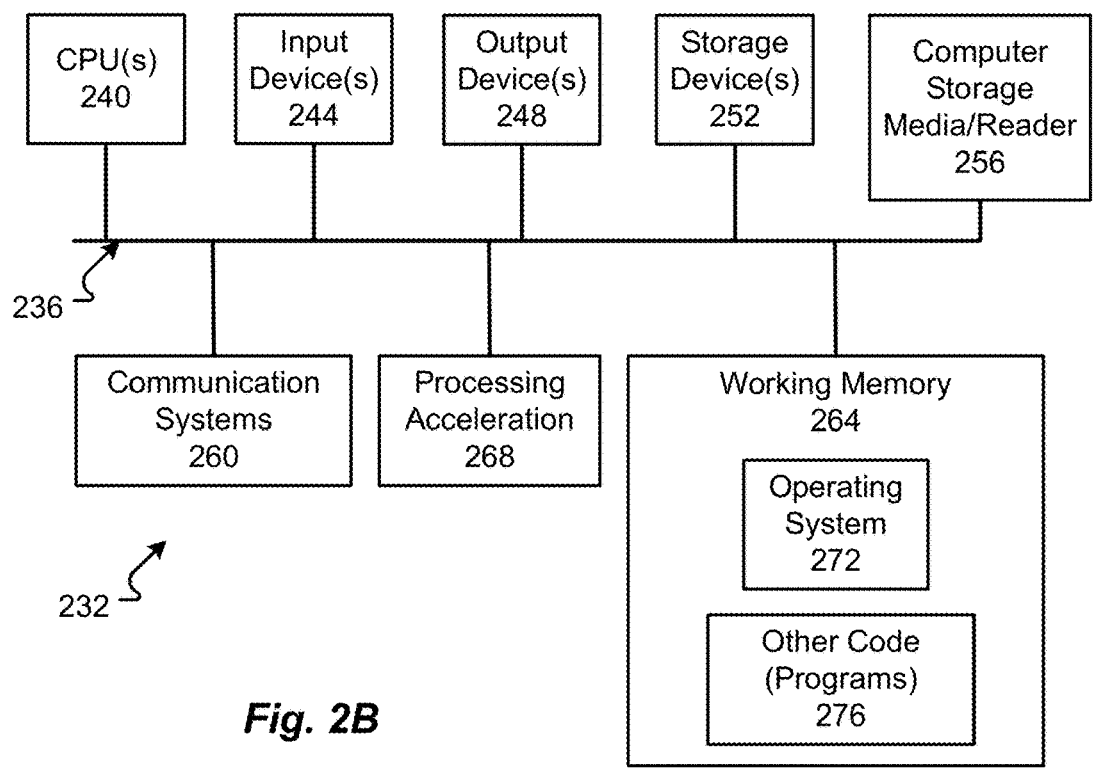
FIG. 2B depicts an example of a computer system upon which a server, computer, computing device, or other system or components may be deployed or executed in accordance with examples of the present disclosure.

FIG. 2B illustrates one example of a computer system 232 upon which the servers 216, 224, user computers 204-212, computing devices, or other systems or components described above may be deployed or executed. The computer system 232 is shown comprising hardware elements that may be electrically coupled via a bus 236. The hardware elements may include one or more central processing units (CPUs) 240; one or more input devices 244 (e.g., a mouse, a keyboard, etc.); and one or more output devices 248 (e.g., a display device, a printer, etc.). The computer system 232 may also include one or more storage devices 252. By way of example, storage device(s) 252 may be disk drives, optical storage devices, solid-state storage devices such as a random access memory ("RAM") and/or a read-only memory ("ROM"), which can be programmable, flash-updateable, and/or the like.

The computer system 232 may additionally include a computer-readable storage media/reader 256; a communications system 260 (e.g., a modem, a network card (wireless or wired), an infra-red communication device, etc.); and working memory 264, which may include RAM and ROM devices as described above. The computer system 232 may also include a processing acceleration unit 268, which can include a digital signal processor (DSP), a special-purpose processor, and/or the like.

The computer-readable storage media/reader 256 can further be connected to a computer-readable storage medium, together (and, optionally, in combination with storage device(s) 252) comprehensively representing remote, local, fixed, and/or removable storage devices plus storage media for temporarily and/or more permanently containing computer-readable information. The communications system 260 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine readable mediums for storing information.

The computer system 232 may also comprise software elements, shown as being currently located within a working memory 264, including an operating system 272 and/or other code 276. It should be appreciated that alternate examples of a computer system 232 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 240 as described herein may include, but are not limited to, at least one of Qualcomm® Snapdragon® with 5G, Apple® A12 and A13 processor, Samsung® Exynos® series, the Intel® Core® or Core 2® family of processors, the AMD® Ryzen™ family of processors, Texas Instruments® Jacinto C6000® automotive infotainment processors, Texas Instruments® Sitara family of processors, ARM® processors, other industry-equivalent processors, and may perform computational functions using any known or future-developed standard, instruction set, libraries, and/or architecture.

Figure 3A:
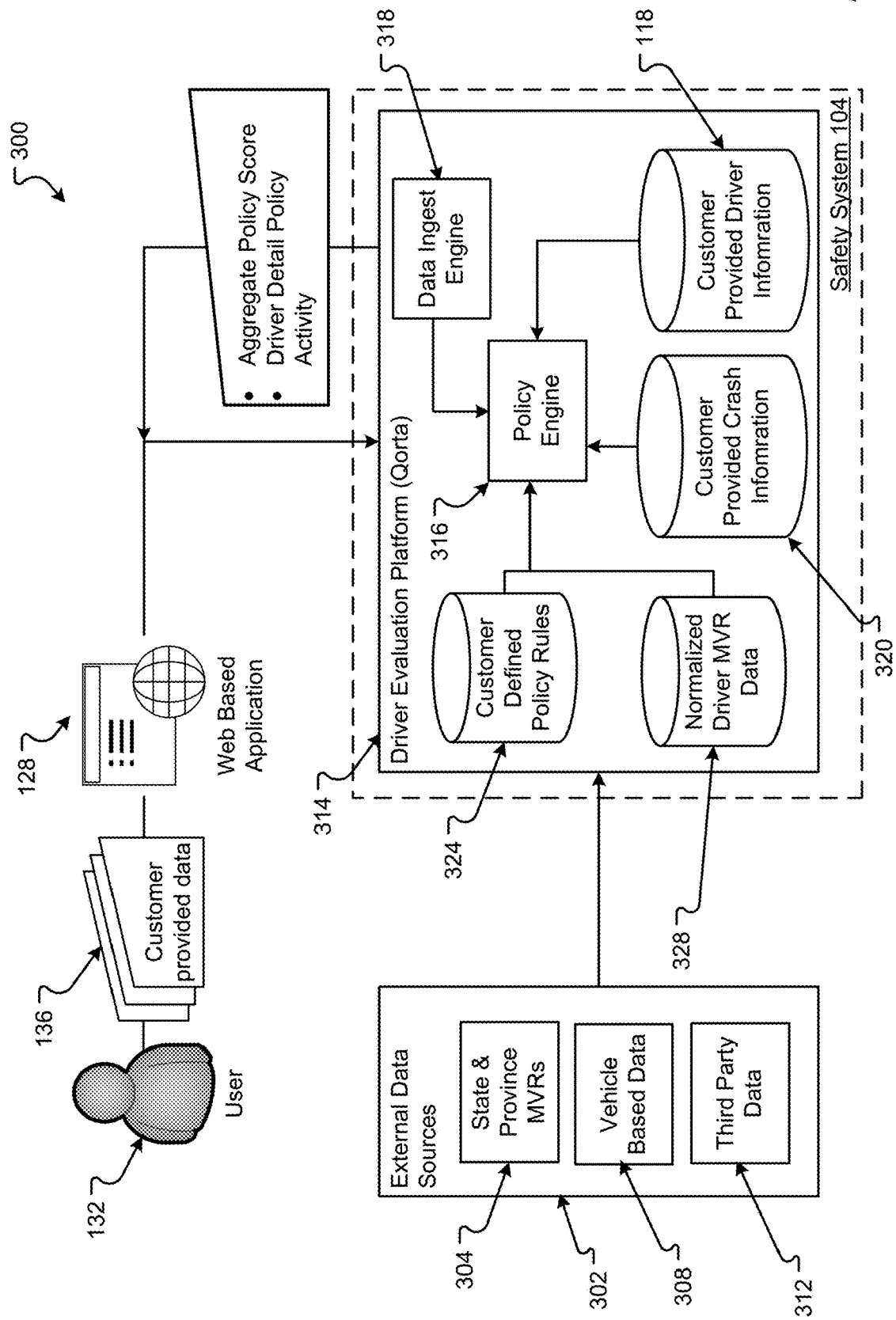
FIG. 3A depicts a hardware/hardware/software architecture in accordance with examples of the present disclosure.

An example of a hardware/software architecture 300 may be as shown in FIG. 3A. The hardware/software architecture 300 can include the user 132, customer-provided driver data 136, the web-based application 128, and the safety system 104, as described in conjunction with FIG. 1. In some configurations, the user 132, the data 136, and/or the web application 128 is not part of this hardware/software architecture. The hardware/software architecture 300 can include a driver platform 314, which may be software in the safety system 104. The driver platform 314 may be in communication with one or more external data sources 302.

As with the data store 118, the external data sources 302 may be part of one or more data storage system(s), as described in conjunction with FIGS. 2A and 2B. The external data sources 302 can include state or provincial motor vehicle records 304, vehicle-based data 308, and/or other data 312. The MVRs 304 can include any information provided or recorded on a driver's MVR. Thus, the MVRs 304 can provide biographical data about the driver, any citations that have been cited against that driver 304, the number of points or demerits assigned to that driver at any one time, other types of incident, and/or other information about the driver including revoked licenses, etc.

The vehicle-based data 308 can include any information about the vehicle personally driven by the driver. The driver may drive a company vehicle during employment hours but have a personal vehicle that they drive off duty. This personal vehicle may be as described in the vehicle-based data 308. Thus, the vehicle-based data 308 can include the make or model of the car, any accidents involving the car, or other such information. Further, the vehicle-based data 308 can include data about the commercial vehicle the driver uses for employment. For example, the vehicle-based data 308 can include inspections performed on the vehicle and any inspection violations found with the vehicle. The vehicle-based data 308 can include data about maintenance or other actions performed on the vehicle, the number of miles driven on the vehicle, and other types of information.

Other data 312 can include any other data that is associated with or describes the driver. Thus, the other data 312 can include insurance data that describes any accidents or insurance claims, either cited against the driver or submitted by that driver. These claims can describe any incidents that may have happened with the driver but were not at a level to warrant a driving citation. Further, the other data 312 can indicate whether the driver has insurance.

The driver platform 314 may include a policy engine 316. The policy engine 316 can compare driver information to one or more organizational policies for drivers, as stored in the customer defined policy rules 324. The customer driver policy rules 324 can include the policies of the organization for its drivers. These policy rules 324 can include what behavior the organization expects from its drivers. For example, the policy rules 324 can include a number of points or citations that are allowed by the driver, either on the job or off-duty, without having their driving privileges, for the organization, revoked. Further, the driver policy rules 324 can include whether insurance is required, a number of incidents that may occur and evidenced by claims to the insurance company, whether the driver must have a license, or other information.

The policy engine can also access normalized driver motor vehicle data, in data store 328. Data in data store 328 may be consolidated or translated from external data 302.

Thus, the normalized driver motor vehicle data store 328 can include an Application Programming Interface(s) (API) that ingests data from one or more of external sources 302 and transforms the data into a common format and description in the data store 328. This common format allows the policy engine 316 to execute across all jurisdictions or driving environments for the drivers in various states.

The policy engine 316 may also have access to customer provided crash information in the data store 320 and/or customer provided driver information 118. The customer provided crash information 320 can include any information about crashes an employee may have had during driving hours during the employment of the individual. This information, along with the provided driver information 118, can be used by the policy engine 316 to determine how safe a driver is while driving on the job.

With access to the information in data stores 320, 324, 328, and 118, the policy engine 316 can create a score or measurement for each driver. The score can include data points based on tickets, crashes, or other incidents. The score may be compared to a threshold or other type of target to determine whether the driver should be removed from driving for the organization, should be trained better or confronted with the bad behavior, or may be suitable for driving for the organization. This factor or score may be provided by the policy engine 316 to one or more user interfaces as described hereinafter. An example implementation of the policy engine 316 may be as described in conjunction with FIGS. 3F and 3G, hereinafter.

The driver evaluation platform 314 can also include a data ingest engine 318. The data ingest engine 318 can communicate with one or more of the external data sources 302 to import data into the data evaluation platform 314. Further, the data ingest engine 318 can modify or transform the retrieved external data into a usable or normalized form to be stored in the database 328. An example data ingest engine 318 may be as described in conjunction with FIGS. 3B through 3E.

Figure 3B:
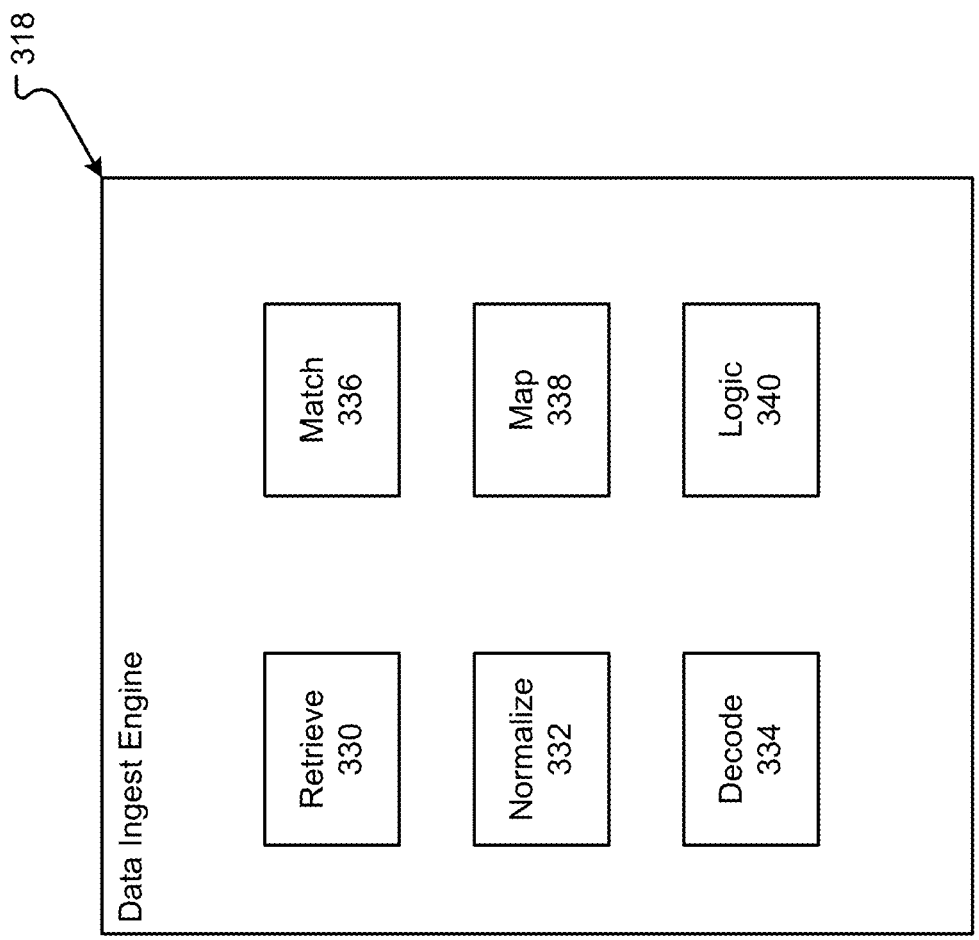
FIG. 3B also depicts a hardware/software architecture in accordance with examples of the present disclosure.

An example implementation of the data ingest engine 318 may be as shown in FIG. 3B. The data ingest engine 318 may be embodied as hardware, software, or a combination of hardware and software. Thus, the functions described hereinafter may be executed as software or can be implemented as gates or circuits in a hardware device, for example, an Application Specific Integrated Circuit (ASIC) or Field Programmable Gate Array (FPGA). The data ingest engine 318 can include one or more of, but is not limited to, a retrieve function 330, a normalize function 332, a decode function 334, a match function 336, a map function 338, and/or a logic function 340. The data ingest engine 318 can also include one or more other functions capable of importing data and transforming that data into a usable form for the driver evaluation platform 314.

Figure 3D:
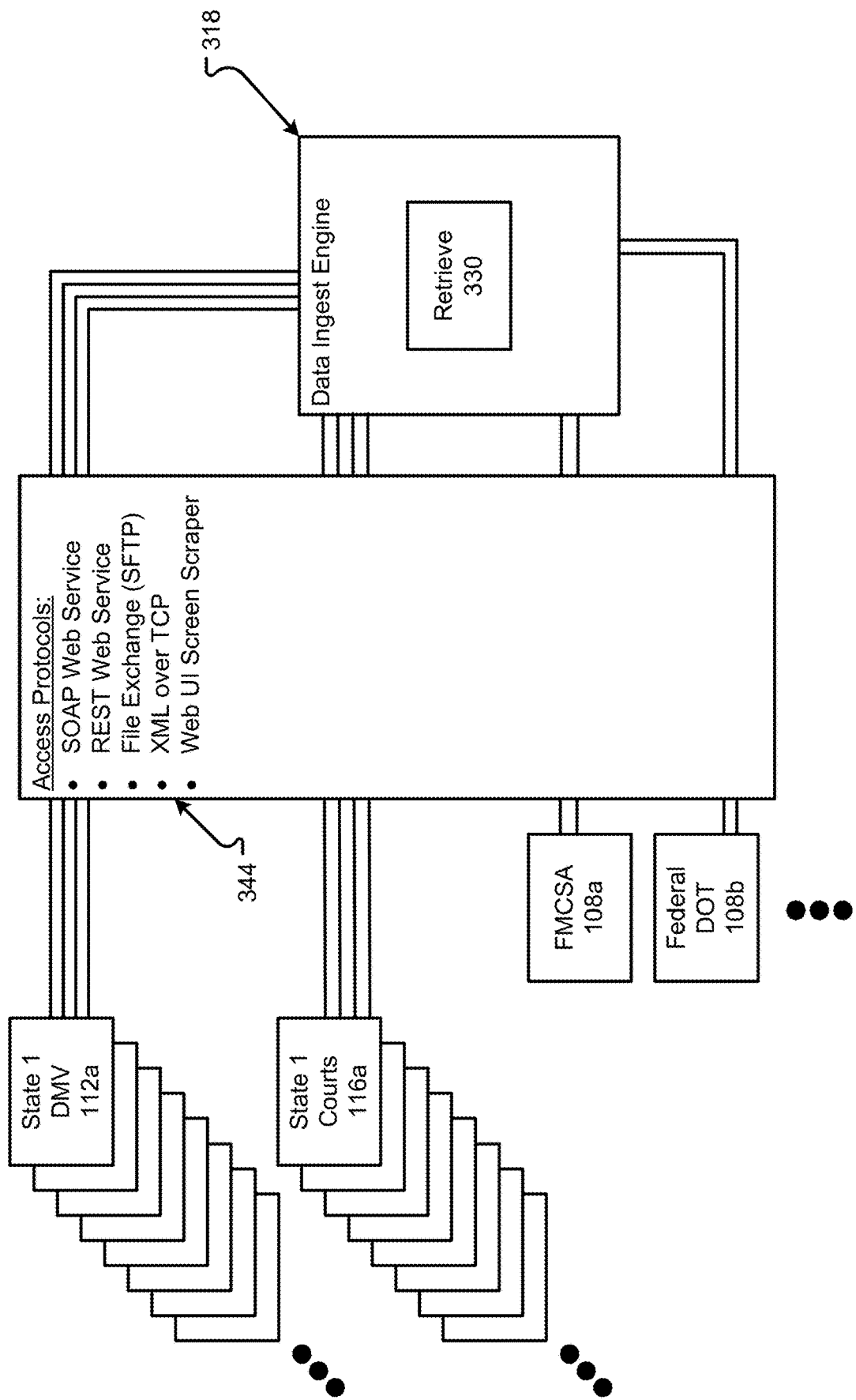
FIG. 3D also depicts a hardware/software architecture in accordance with examples of the present disclosure.
Figure 3E:
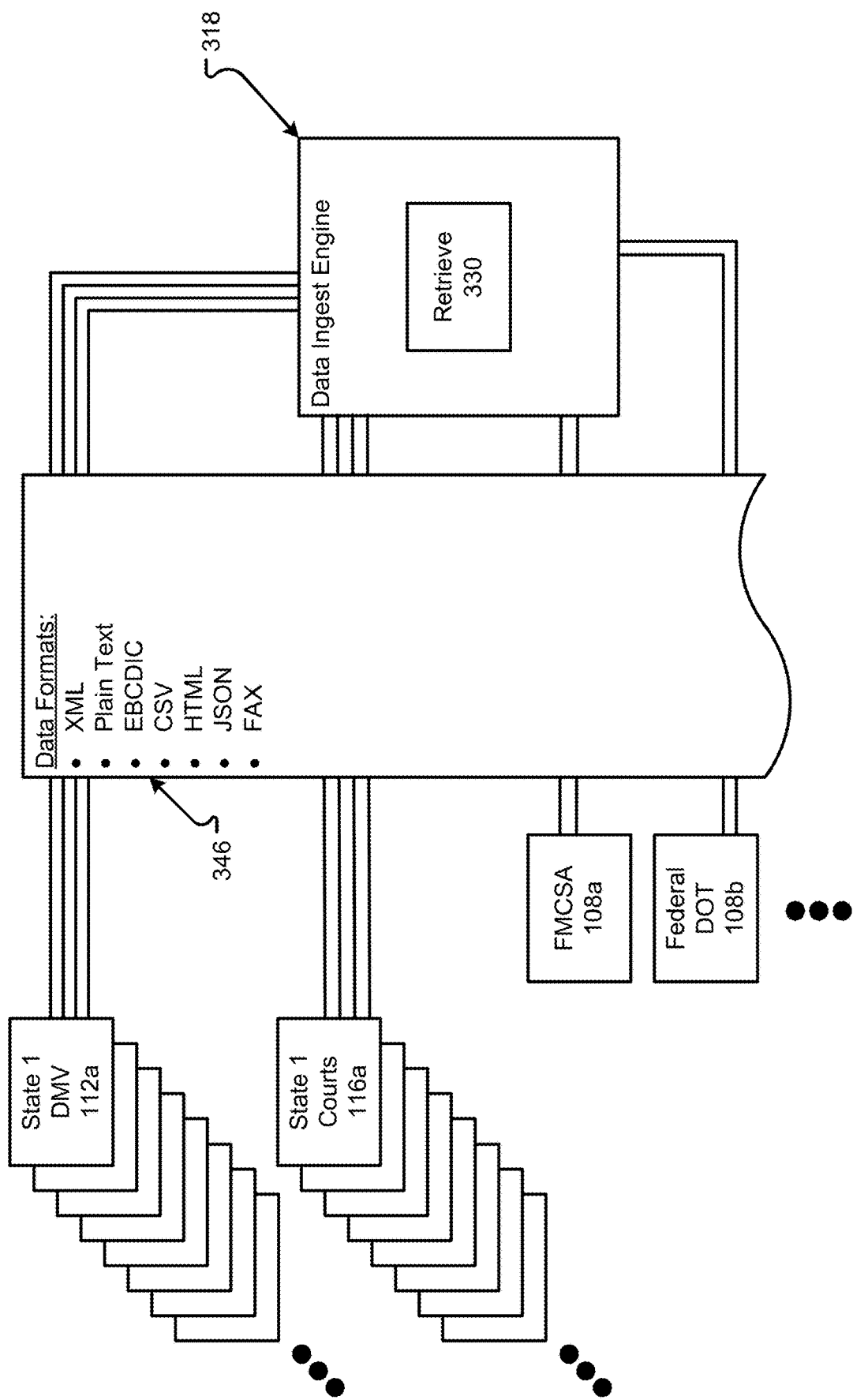
FIG. 3E also depicts a hardware/software architecture in accordance with examples of the present disclosure.

The retrieve function 330 can make one or more physical (wired or wireless) or communication connections with external data sources 302. Further, the retrieve function 330 can communicate with these external data sources 302 through one or more protocols. Still further, the retrieve function 330 can import data in one or more formats into the data ingest engine 318. An implementation example of the retrieve function 330 may be as described in conjunction with FIGS. 3C-3E, provided hereinafter.

The normalize function 332 can modify one or more items the data or records retrieved by the retrieve function 330 into a common or standard format. The normalization function 332 can process text into a single canonical form. The normalizing of the text in the retrieved MVRs or other data allows for the separation of concerns as the input to further operations in the data ingest engine 318 is in a standard form or format. The normalize function 332 may modify each type of document received by the retrieve function 330 into a text or document format known by other processes executed by the data ingest engine 318. This normalize function 332 can convert numbers, phrases, dates, acronyms, abbreviations, etc. into common or known words. The normalize function 332 can also remove or apply any type of grammatical correction, visual formatting, or other formatting to the document. In this way, the normalize function 332 can provide a standard output document from the various disparate input documents received by the retrieve function 330.

The decode function 334 can decode or interpret the codes provided within the normalized document generated by the normalize function 332. Each motor vehicle record can have a code or some type of description of incidences recorded within the MVR. For example, one MVR may indicate an alphanumeric, numeric, or other type of code, for a speeding ticket. In another example, a different state may include an MVR that only provides a phrase, for example, "10 mph above indicated speed limit." These types of codes or indications within the MVR are interpreted by the decode function 334 and presented to the match function 336. Thus, the decode function 334 can indicate one or more code(s) and indicate with which parts of the normalized document those codes are associated.

The matching function 336 can match biographical data associated with a driver to entries in one or more of the external data sources 302. For example, the matching function 336 can receive the driver information, for example, as submitted by the customer or driver, and with a high degree of accuracy, match the provided information with the same or similar information in the other data sources 302 to ensure that the driver platform 314 is aggregating data for the same person. Each data source 302 may have a different level of matching accuracy. For example, an MVR can provide a highly accurate match because the match is based on the State Driver's License number (which is a uniquie identifier for the driver). State Court records may require more effort to match the biographical information because the driver's name may be different and often the State Court record does not include the driver's license number to match. To match informaiton in the State Court records, the matching function 336 may rely on additional data sources and logic (e.g., equating Rich to Richard) and can rely on other data elements, for example, date-of-birth, address, zip code, etc. to ensure there is a proper match. Matching information to insurance cliams data can require a match on either the driver's license number or an employee identifier provided by the customer. Thus, each data source may have a different matching critiera and logic to ensure the matching function 336 can associate the data in the data source 302 with the correct "person" or "license."

The mapping function 338 can map the various codes, provided by the decode function 334, to a standard set of codes or a standard set of violations or other types of information. The driver evaluation platform 314 can have a standard set of violations or information that can be evaluated. For example, the driver evaluation platform 314 can provide data or information about speeding tickets that are 5 mph over the limit, 10 miles per other limit, etc. and standard codes. Thus, the mapping function 338 can map the decoded information in the normalized MVR or other information to one or more of these standard sets of information.

The mapping function 338 can then take the information and map those violations or other information to the set of standard codes and point values. For example, the mapping function 338 can assign a standard code for the event, create a data structure for the assigned code, and assign a point value for the event, for example, a speeding ticket where the driver is driving 10 mph over the speed limit. Another standard point value may be assigned for accidents other types driving tickets or other incidences recorded in the MVR or state court records. Thus, the output of the mapping function 338 is a standard set of scores or a standard set of point values associated with the information the MVR that may be universal across different drivers in the various state jurisdictions. This final standard point output may then be provided to the logic function 340.

The logic function 340 can apply one or more logic functions to the standardized and normalized MVR information. This logic 340 can include settings for thresholds or other point calculations that can alter the visual indicia as described hereinafter. The logic 340, thus, may interpret the normalized and standard output data, from the mapping function 338. In this way, the driver evaluation platform 314 can provide a set of user interfaces or other types of user information that may be understandable and actionable by one or more users and can address specific needs of the user. Another compoent of logic 340 may include the generation of proxy or other data for addressing blanks or other omissions where States or other data sources do not provide the data or do not compute values. For example, one State may provide a violation/action that indicates the license was suspended but does not provie the license status. In this situation, the logic function 340 can apply logic to indicate that the license status is "suspended."

An implementation example of the retrieve function 330 may be as shown in FIG. 3C. The retrieve function 330 may make one or more physical (wired or wireless) or communication system connections between various sources of external data 108, 112, and/or 116. For example, the retrieve function 330 may make communications system connections to one or more of the States' Licensing Authority (e.g., Department of Motor Vehicles) 112. Each one of these connections may have a different type of connection and/or set of requirements. Further, the retrieve function 330 can also make communications system connections to the States' Courts 116, the Federal Motor Carrier Safety Administration (FMCSA) 108*a* to obtain Compliance, Safety, Accountability (CSA) information, and/or the Federal Department of Transportation (DOT) systems 108*b*. Each set of communication system connections 342*a*-342*d* may include different types of physical, electrical, communication system, or telecommunication connections.

Some of the connection 342 can include instant MVR connections. These instant MVR connections can allow for the interaction with an application programming interface (API) or other type of interface that allows for the retrieval of MVRs either instantly or in near real-time for one or more drivers. Another types of connection may allow for batch MVR connections. Batch MVR connections can also include an API or interface that allows for the extraction of two or more MVRs for two or more drivers. The connections can also include vehicle record connections that allow for the reading of the MVR without a download or retrieval of such record. Further, one or more connections may be manual motor vehicle record connections that require a form or some other type of interface to be filled out before retrieving MVR. As opposed to the instant or batch MVR connections where a list of names or data may be submitted to the DMV to retrieve records, the manual connection may require more involved interface interaction that includes entering information to retrieve the MVR.

One or more the connections may be virtual private network (VPN) connections requiring the establishment of a VPN or security protocols to allow the connection through the VPN. Other connections can include point-to-point connections requiring a more involved interaction to establish a connection between the driver evaluation platform 314 and the particular DMV site or system 112.

Other connections can include the DOT connections 342*d*, the FMCSA connection 342*c*, hosted database connections (which require the retrieval or download of database changes in the DMV database), or other third party vendor connections. The retrieve function 330 can establish and manage the numerous and varied types of connections to these different systems 108-116 to retrieve data. In this way, the retrieve function 330 provides a technical advantage in allowing for the retrieval and processing of large volumes of electronic data over disparate and different electronic data connections for retrieval of MVR data that would not be able to be retrieved manually by a person and certainly not by a person in a timely manner.

Another implementation example of the retrieve engine 330 may be as shown in FIG. 3D. The retrieve function 330 may also employ one or more access protocols to retrieve data from the external data sources 108, 112, 116. For example, the retrieve function 330 may use a Simple Object Access Protocol (SOAP) web service to retrieve data. SOAP is a messaging protocol that allows the exchange of structured information in the web service. SOAP can use an eXtensible Markup Language (XML) information set for message format and can rely on Hypertext Transfer Protocol ((HTTP) for messaging transmission. SOAP allows for the invocation of processes on the operating systems to communicate by XML.

In another example, the retrieve function 330 may employ the Representational State Transfer (REST) web service. REST is an architectural style that can provide interoperability between computers systems on the Internet. REST allows for the manipulation of textual representations on the Internet using stateless operations. REST allows for the request of information to a data source Uniform Resource Indicator (URI) that may be responded with a type of payload, for example HTML, XML, JavaScript Object Notation (JSON), or other format. The responses can indicate a change to a resource state and allow for the request of that information.

Still other protocols can include the Secure Shell Protocol (SSH) File Transfer Protocol also referred to as the secure file transfer protocol (SFTP) that provides file access, file transfer, and file management over a data stream. SFTP allows for a secure channel to be created between the retrieve function 330 and the external data source for file transfer over the Transport Layer Security (TLS) layer and transfer of management information in a VPN. SFTP allows for a wide variety of operations to be made on a remote file, including extracting data therefrom to be provided to the retrieve function 330.

There retrieve function 330 may also retrieve XML over Transmission Control Protocol (TCP). TCP allows the delivery of bytes of data in an XML file from the external data source to the retrieve function 330. This TCP protocol allows for file transport of the XML data over the TCP connection.

In some very rudimentary DMV systems, there retrieve function 330 can also use a screen scraper to scrape the web-based user interface (UI) of the external data source. In this implementation, the retrieve function 330 reads or retrieves data presented in a UI at the DMV user interface or web window. The retrieve function 330 can extract this information and any metadata that may be available by the look and feel of the user interface and compile MVRs from such screen-captured information.

Beyond the protocols used to obtain the data from the external data sources, there retrieve function 330 can also ingest or retrieve various data formats. The various data formants may be as shown in FIG. 3E. The data formats 346 can include one or more of, but are not limited to, XML, plaintext, Extended Binary Coded Decimal Interchange Code (EBCDIC), Comma Separated Values (CSV), HTML, JSON, fax data, etc. XML is a markup language that includes a set of rules for encoding documents in a format that's both human readable and machine readable. XML's schema specification may be as provided by the World Wide Web Consortium. Various different XML schemas have been developed, and the retrieve function 330 may include one or more APIs used to process the XML data from the external data sources 108-116 depending on the schema used by said external data source.

EBCDIC is a byte character encoded file format mainly used on mainframes systems. EBCDIC was developed by IBM to communicate data amongst mainframe or other types of computing systems. The retrieve function 330 can process the EBCDIC files.

CSV is a text file format that uses commas to separate data values. Each record within a CSV file may have one or more fields that are separated by commas. A CSV file may not be standardized, and as such, the retrieve function 330 can include an API or other type of interface to extract data that is particular to those CSV file format of the data source.

HTML is another markup language that is designed for displays in web browsers. An HTML document may be retrieved by a Web server and rendered into a webpage. There retrieve function 330 can extract HTML elements and/or one or more items of metadata, if available, to create documents from the provided HTML.

JSON is an open standard file format that can use human readable text to store and transmit data objects. JSON can consist of attribute value pairs and an array of data types. JSON can serve as a replacement for XML. There retrieve function 330 can parse the JSON formatted data and retrieve such data for provision to other functions.

Another possible data form is a Portable Document Format (PDF). PDF is a file format developed by Adobe® to present documents that is system independent. PDFs may include an image or actual text. If an image is provided in the PDF, an optical character recognition function may transform the image into readable text.

In still other implementations, an image may be provided from an image capture device, e.g., a camera. A vehicle monitor or control system can produce images of traffic incidents, e.g., crashes. The images may be analyzed to determine information about a driving event, for example, who was at fault for crash. These images may be imported with or without metadata to determine driver profile information.

In some implementations, the data from the DMV may be received as a fax. This telephonic transmission of scanned data may be received by the retrieve function 330 and interpreted into an image. The image may then be scanned for characters or other information using optical character recognition or other types of transformations. The output of the text recognition system may then be provided to other functions by the retrieve function 330.

There may be other types of data formats used and ingested by the retrieve function 330. Further, the retrieve function 330 can access data using different types of protocols or different types of connections than those described herein. Thus, the retrieve function 330 is operable to retrieve data using numerous types of data connections, file formats, and protocols and outputting all the data from these different systems into the data ingest engine 318.

Figure 3F:
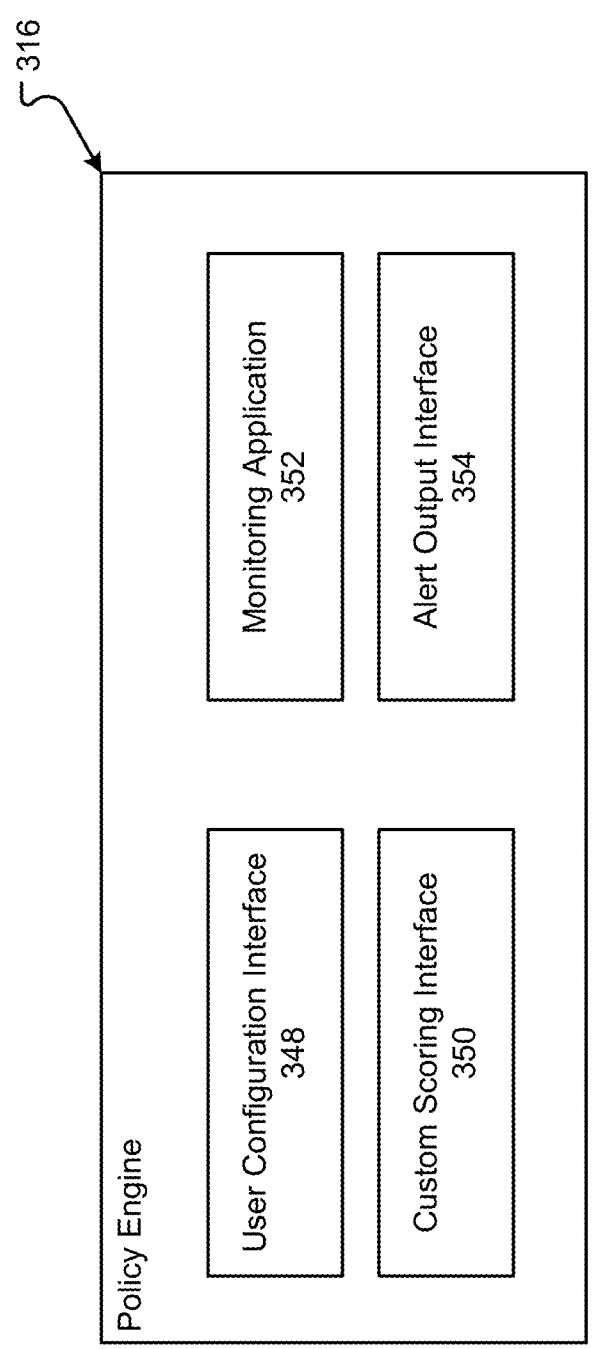
FIG. 3F also depicts a hardware/software architecture in accordance with examples of the present disclosure.

An implementation example of the policy engine 316 may be as shown in FIG. 3F. The policy engine 316 can include one or more of, but is not limited to, the user configuration interface 348, a custom scoring interface 350, monitoring application 352, and/or an alert output interface 354.

The user configuration interface 348 allows for the user to configure the policy and the scoring for the various drivers. The user configuration interface 348 allows the user to provide policies or policy rules to the policy engine 316. Further, the user configuration interface 240 can allow the user to change the inputs or outputs to the policy engine 316, for example, changing the user interfaces, as described hereinafter. Any input from the user may be applied through the user configuration interface 248 through one or more visual displays or other types of input interfaces.

The custom scoring interface 350 can apply different rules to the scores generated by the policy engine 316. In examples, the policy engine 316 can generate a score for the MVR, and or the driver based on the policy. The scoring may be standardize across all different users. However, custom scoring interface 350 allows the user to change how the scoring may be completed or provided. Thus, the user may adjust the number of points given to different infractions or events or may change thresholds used to determine whether a driver is a risk or not. Both the inputs to the user configuration interface 248 and the custom scoring interface 350 may be stored within the safety system 104 as customer defined policy rules 324.

The monitoring application 352 may monitor one or more drivers of the user. As explained hereinafter, the monitoring application 352 may receive inputs from the user to monitor one or more drivers. Monitoring application 352 can then access monitor data sources as described previously to determine changes in driver's situation, score, risk, etc. An example implementation of the monitoring application 352 may be as described in conjunction with FIG. 3G.

The alert output interface 354 may produce one or more alerts either associated with generating an initial policy score and or based off of changes in risk as determined by the monitoring application 352. The alert output interface 354 may be configured by the user to output alerts as one or more displays or messages. In at least some examples, the alert output interface 354 may produce the user interfaces as described in conjunction with FIGS. 14A through 14D.

Figure 3G:
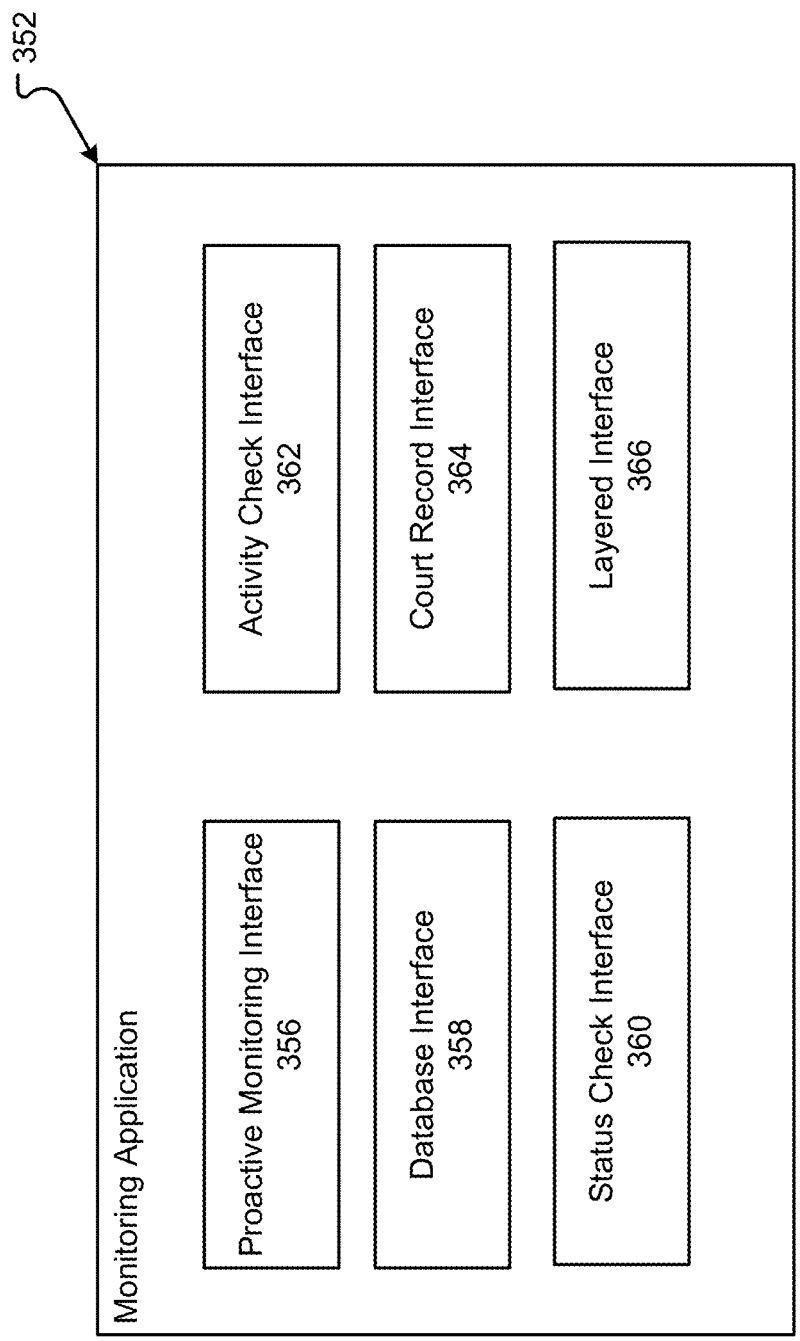
FIG. 3G also depicts a hardware/software architecture in accordance with examples of the present disclosure.

An implementation example of the monitoring application 352 may be as shown in FIG. 3G. The monitoring application 352 can include one or more of, but is not limited to, a proactive monitoring interface 356, a database interface 358, a status check interface 360, an activity check interface 262, a court record interface 364, and/or a layered interface 366. Each of the different interfaces 356 through 366 are capable of monitoring drivers with one or more different processes or procedures.

The proactive monitoring interface 356 may receive periodic notifications of changes within the MVRs of a state MVR database. In some States, a statewide program allows for daily notifications of changes to MVR records. The proactive monitoring interface 356 may subscribe to the information notifications and may receive information about one or more drivers that may be being monitored. The state DMV may provide changes to data or provide updates to the MVR, as the MVRs are changed. In this way, changes to the MVRs are pushed to the proactive monitoring interface 356 for provision out for alerts.

The database interface 358 may receive snapshots of the database including all records. The snapshots or views of the database may be checked for changes associated with any of one or more drivers being monitored. In some implementations, only changes to the database are provided. In other implementations, a complete snapshot of the database is provided and must be checked for changes by the database interface 358. In other words, the database interface 358 may poll for and receive changes from the databases from the database systems that provide full snapshots of the database.

The activity check interface 362 can check for activity on one or more MVRs. Rather than providing an actual change to an MVR, some states may provide information that activity has occurred in the MVR. These activity checks may indicate that a new MVR needs to be retrieved to determine what the activity was. In some implementations, the activity notice is only provided for one or more drivers that the activity check interface 362 provides to the DMV. In other implementations, all activities are provided to the activity check interface 362, and then the activity check interface 362 must scan or filter out one or more drivers being monitored. It is also possible, for the activity check interface 362 to look back at driver activity over some period of time, e.g., the past six months, the past year, etc.

The court record interface 364 can monitor various changes or inputs to court records. In this way, by scanning for driver identification information, the court record interface 364 can determine if an adjudicated violation or charges has been made against the driver. This discovered court record information may then indicate activity that should be on motor vehicle records at some point thereinafter. Often, there is the delay between the adjudication or charge of an offense and the recording of that offense or conviction onto an MVR. The court record interface 364 may execute rules to direct the retrieve function 330 to retrieve an MVR at some point after the delay period when it is most likely that the MVR will show such information.

Status check interface 360 can check the validity of a driver's license and may pull an MVR if the license is no longer valid. The status check interface 360 may scan information from the DMV for changes to the status of the driver, for example, that the driver maintains a valid driver's license. There may be no other information that might be provided from some states except the status of the driver's license, and thus, only if the driver has some violation which changes the validity of their driver's license, the state check interface 360 can direct the retrieve function 330 to retrieve a new MVR.

Layered interface 366 may provide a combination of the different interfaces described above. For example, there may be a combination of both the court record interface 364 and the status check interface 360 that may be applied to some states to determine when a new MVR needs to be retrieved. As such, the layered interface 366 may function as a combination of the one or more interfaces provided above.

Figure 4:
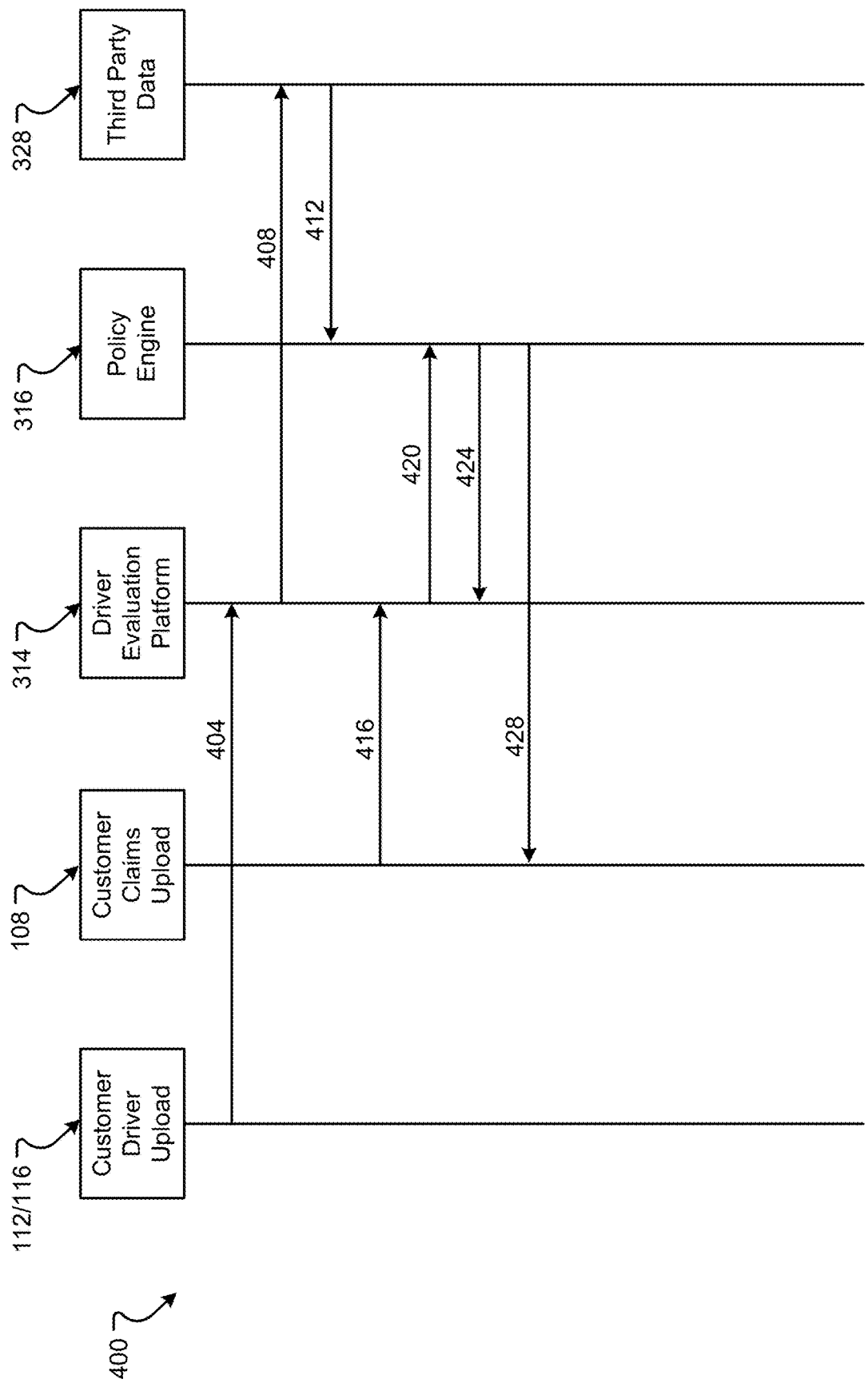
FIG. 4 depicts a signaling process in accordance with examples of the present disclosure.

An example of a signaling process 400 may be as shown in FIG. 4. The signaling process 400 may be between a customer driver upload systems 112/116, a customer claims upload systems 108, the driver platform 314, the policy engine 316, and/or one or more third party data integrations 108. In at least some configurations, the user 132 may send an upload of driver information, in signal 404, from a customer driver upload system 112/116. The upload information can include or add drivers to a customer roster of employed drivers that should be evaluated and monitored by the policy engine 316. The signal 404 may be sent from the user 132 to the driver platform 314.

The driver platform 314 may then access one or more third party data integrations, represented by external data 302, in one or more signals 408. The driver platform 314 can retrieve or request information from the external data sources 304 through 312. This information may be returned to the policy engine 316, in signals 412. Thereinafter, the policy engine 316 can store the data into one or more of the data stores 118, 320, 324, 328. Further, the customer claims upload component 108 can upload claims associated with the user 132 and/or one or more insurance companies or other third party systems. This uploaded claims data, in signal 416, may be sent to the driver platform 314. Thereinafter, the driver platform 314 may send the claims data that may be normalized or translated from the various insurance companies or other third party systems to the policy engine 316, in signal 420. Policy engine 316 may store this information in the normalized driver motor vehicle data system 328.

The policy engine 316 may then generate scores for the various drivers provided in the roster 404. This policy scoring may then be reported to the driver platform 314, in signal 424. The driver platform 314 can transform the data into one or more user interfaces that may be provided to the web-based application 128 and then to the user 132, in signals 428. The user interfaces generated from the signal 428 may be as described hereinafter.

An example of a data store 500, which may represent one or more items the data stored in various data stores 118, 320, 324, 328, etc. may be as shown in FIGS. 5A and 5B. The data store 500 can include one or more data structures 504 and/or 528. There may be more or fewer data structures, in data store 500, than those shown in FIGS. 5A and 5B.

Data structure 504 may represent driver information. The data structure 504 can include one or more of, but is not limited to, driver's license information or number 508, a driver identifier (ID) 510, state information 512, biographical information 516, etc. There may be more or fewer fields in data structure 504, as represented by ellipses 520. Further, each driver may have their own data structure 504, and thus, there may be more data structures 504 shown in data store 500, as represented by ellipses 524.

Driver's license information 508 can include the driver's license number(s) from the driver's license(s) of the driver. The driver's license information 508 can also include other information, for example, an address, a height, a weight, eye color, hair color, whether the driver desires to be an organ donor, etc. This information may be used to identify the driver to the organization and may be used to help record or retrieve information about the driver from various external sources 302.

The driver Identifier (ID) 510 can be a separate identifier for driver. The ID can be a numeric ID, an alphanumeric ID, a name, a globally unique identifier (GUID), or some other type of ID. Regardless of the type of ID 510, the driver ID 510 can uniquely identify the driver amongst other drivers in the organization or within the safety system 104.

State information 512 can include the state where the driver's license 508 was issued, the state of residence, or other state information. The state information 512 describes the jurisdiction for the driver and may change the driver policy based on this information.

The biographical information 516 can be any information about the driver that may be provided by the driver's license 508 or other sources. As such, the biographical information 516 can include the name, address, phone number, or other information. This information 516 may be used to better identify the driver for the organization.

Data structure 528 can include information regarding the driver's performance. The data structure 528 can include one or more of, but is not limited to, a driver ID 510, data source 532, and/or a policy score 536. There may be more or fewer data fields in data structure 528, as represented by ellipses 540. Each driver may have a different data structure 528 and, as such, there may be more or fewer data structures 528 in data store 500, as represented by ellipses 544.

The driver ID 510 may be the same or similar to the driver ID 510, as described in conjunction with data structure 504. As such, the driver ID 510 will not be explained further herein.

The data source 532 can be an indication or pointer to the external data source 302 from which the information contained in the data structure 528 originated. The data structure source 532 can include an identifier for that external data source, whether the identifier is a URL, or other type of ID. Data source 532 may also include the data used to generate the policy score. Thus, data source 532 can include the infractions, collisions, or other data that may have generated the policy score.

The policy score 536 is the score generated by the policy engine 316. This policy score 536 may have one or more components, described hereinafter, or may be a simple indicator of driver performance, for example, a red light, green light, etc. The policy score 536 may be changed or compared to different thresholds to determine how to best manage the driver with the policy score 536.

Figure 6:
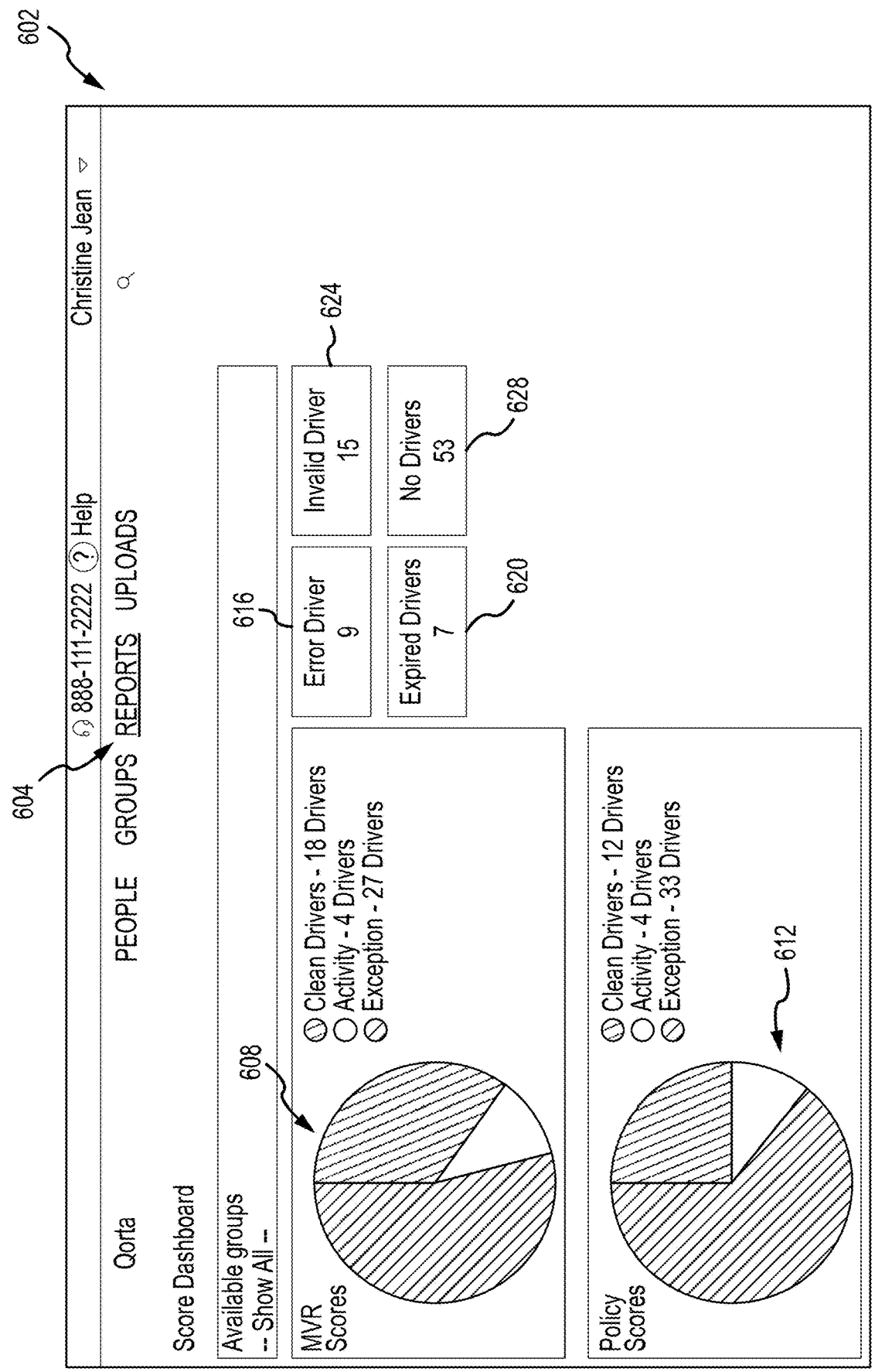
FIG. 6 depicts a graphical user interface for providing driver and/or organization information in accordance with examples of the present disclosure.

As illustrated in FIG. 6, a graphical user interface 602 is provided depicting a dashboard associated with driving information for an organization. The dashboard may provide a summary view of an organization's motor vehicle record (MVR) scores 608 and policy scores 612. The MVR scores 608 may be depicted in one or more graphic elements and/or graphic types; the MVR scores 608 may provide information related to an organizations MVR score and/or MVR score thresholds as configured by an administrator of an organization. In some examples, and as depicted in FIG. 6, the MVR score may depict a number of drivers having a clean driving record. Alternatively, or in addition, the MVR score may depict a number drivers that have had activity of a specified type within a period of time, such as within the last week, last month, last year etc. The activity may correspond to activity affecting a driving record, such as speeding tickets, accidents, and/or other traffic infractions etc., and/or may include activity that may occur in the future, such as a license renewal date, a test date, and an inspection date, etc. Alternatively, or in addition, the MVR score 608 may depict a number of drivers within an exception category; the exception category may correspond to a number of drivers possessing one or more driving characteristics that are outside of a predetermined or preconfigured threshold. For example, one or more drivers may have a combination of driving characteristics resulting in an individual MVR score that is below a recommended and/or desired score. As one non-limiting example, the exceptions category may include all individuals having an individual MVR score that is in excess of a threshold, 15, for example.

The policy score 612 may include visual indicia that may be depicted in one or more graphics and/or graphic types; the policy score 612 may provide information related to an organization's compliance with an organization's driving policy and/or a best practices policy. In some instances, an organization may configure their own policy score thresholds that delineate or otherwise separate drivers having a clean driving record from drivers having a questionable driving record, drivers having recent activity, from drivers having no recent activity, and/or drivers exceeding one or more policy exceptions.

While the MVR score may be one component of the policy score and may be displayed in a graphical element 608, for example. The policy score may depict a number of drivers complying with the organization's policy. That is, a driver may have a good MVR score but may be out of compliance with an organization's driving policy or have a worse policy score because other data beyond the MVR can be included in the policy score 612. In some examples, and as depicted in FIG. 6, the policy score 612 may depict a number of drivers having a clean driving record and that are in compliance with the organization's driving policy. Alternatively, or in addition, the policy score 612 may depict a number drivers that have had driving activity within a period of time, such as within the last week, last month, last year etc. The activity may correspond to activity affecting a driving record, such as speeding tickets, DUIs, etc., and/or may include activity that may occur in the future, such as a license renewal date, a test date, an inspection date, etc. In some instances, the activity may be specific to an organization's policy, such as refresher training, inspections, or otherwise. Alternatively, or in addition, the policy score 612 may depict a number of drivers falling into an exception category outside of the organization's policy; the exception category may correspond to a number of drivers possessing one or more driving characteristics that fall outside of a predetermined or configured threshold for such a policy. For example, one or more drivers may have a combination of driving characteristics resulting a in an individual policy score that is outside and/or non-compliant with a recommended and/or desired policy score. As one non-limiting example, the exceptions category may include all individuals that are not in compliance with an organization's driving policy.

The graphical user interface 602 may depict additional information regarding drivers associated with an organization. For example, the graphical user interface 602 may depict a number of error drivers 616, where an error driver may be a driver having some issue affecting driver data. For example, the error driver may have an invalid driver's license number (for example, a number or letter is transposed) or one or more portions of a driver's profile may be incomplete or missing. In some instances, the graphical user interface 602 may depict a number drivers 620 having expired and/or incompatible driver's license, and/or a number of invalid drivers 624 corresponding to drivers not in compliance with one or more requirements. The graphical user interface 602 may include a number of drivers not having an MVR 628, for example, one or more drivers for which an MVR record does not exist or has not otherwise been obtained. A user may interact with the each of the graphical elements 608, 612, 616, 620, 624, 628, and/or 604 to display additional data associated with each element. In some instances, the user may select a different way of displaying the information, for example by selecting a different menu or category 604.

A user may interact with one or more graphical elements 604-628 depicted in the graphical user interface 602 to obtain or otherwise display additional information associated with the selected graphical element. For example, if a user were to select the policy scores 612, a graphical user interface 702 may be displayed as illustrated in FIG. 7. More specifically, the graphical user interface 702 may provide detailed information for the policy score 612—displaying drivers and scores that go into the overall graphical element 612 and/or the score behind the graphical element 612. For example, the graphical user interface 702 may provide a policy score for each individual of an organization or group of individuals, and an MVR score for each individual or group of individuals. The graphical user interface 702 may additionally provide additional information 716 associated with each individual. For example, non-limiting examples of additional information 716 may include an individual's name, license number, a latest date associated with an MVR record (for example, the last time an individual's MVR score and/or record was computed), a license status, and a license expiration date.

Figure 8:
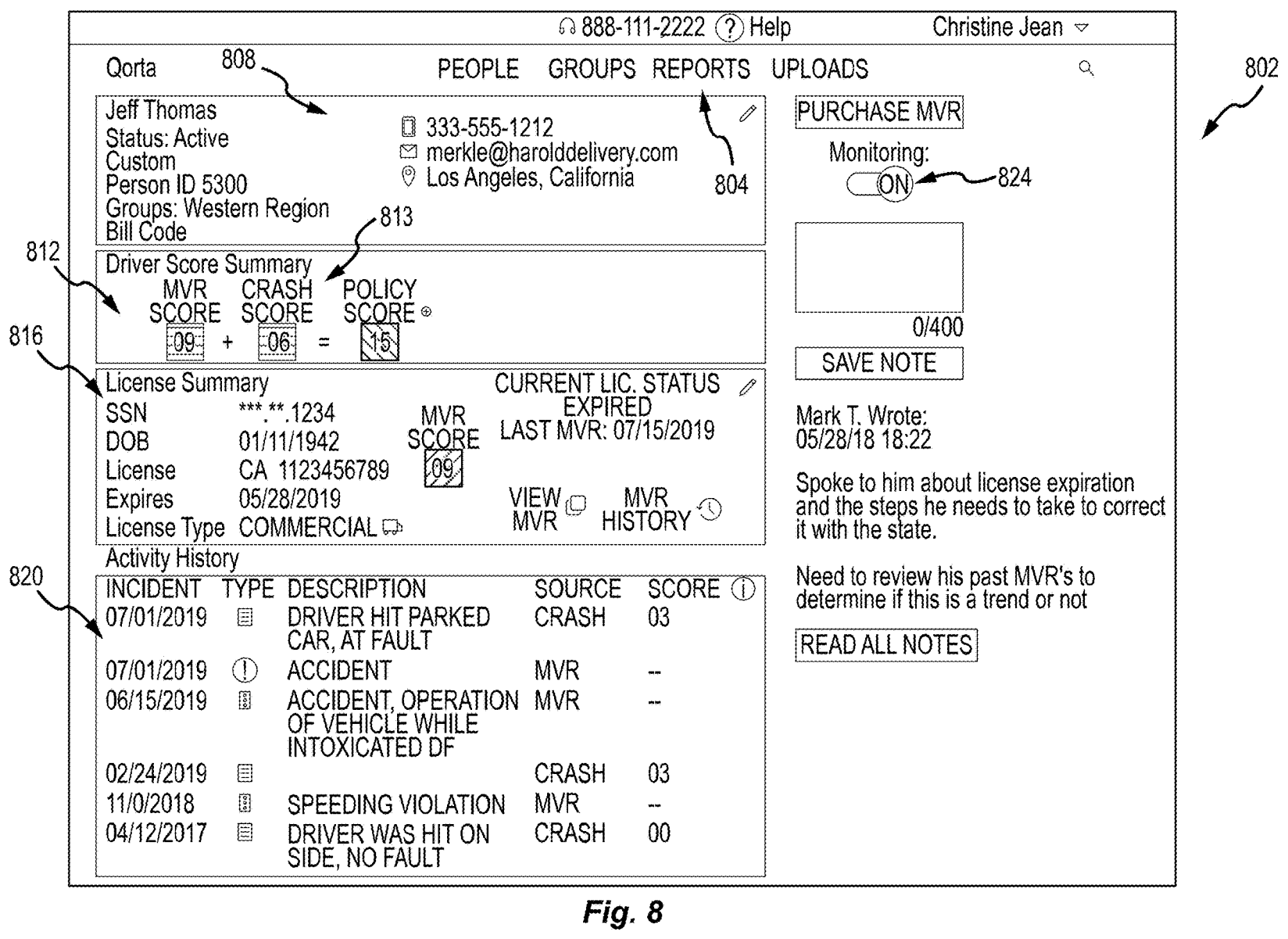

As further illustrated in FIG. 8, a graphical user interface 802 may be displayed. The graphical user interface 802 may display additional information associated with each individual. For example, if a user was selected in the graphical user interface 702, the underlying user information may be displayed in the graphical user interface 802. That is, driver, or individual, information may be displayed at 808, and a computation of a policy score 812 may be presented, where the policy score may rely on or otherwise be based on the MVR score and/or a separate crash score 813. In addition, the graphical user interface 802 may include driver's license summary information 816 and activity information 820. Activity information 820 can include a history of events, e.g., crashes, tickets, etc. associated with the driver. In some examples, the graphical user interface 802 may allow an administrator, or otherwise, the ability to toggle on and/or off the monitoring of a user or driver utilizing the selectable graphical element 824.

As further depicted in FIG. 9, a graphical user interface 902 may be displayed which may be the same as or similar to the graphical user interface 802 and may further include a compliance, safety, and an accountability (CSA) information 904 in accordance with examples of the present disclosure. The CSA information 904 may include information from a CSA authorized data provider and may include one or more scores corresponding to various components. Standard point values may be assigned to the CSA information to generate a CSA score. In some example, the CSA score may be utilized in the computation of the policy score.

In accordance with some examples, the crash score 813 may correspond to crash information and/or crash related information, as depicted in FIG. 10. The crash information may be presented in a graphical user interface 1002 and may include crash information and/or crash related information 1004 corresponding to an individual or driver. In some instances, the crash information 1004 may correspond to crash information for an organization, an individual, and/or other group within the organization. In some instances, crash information corresponding to the crash information 1004 may be uploaded utilizing the upload graphical element 1006.

Figure 11:
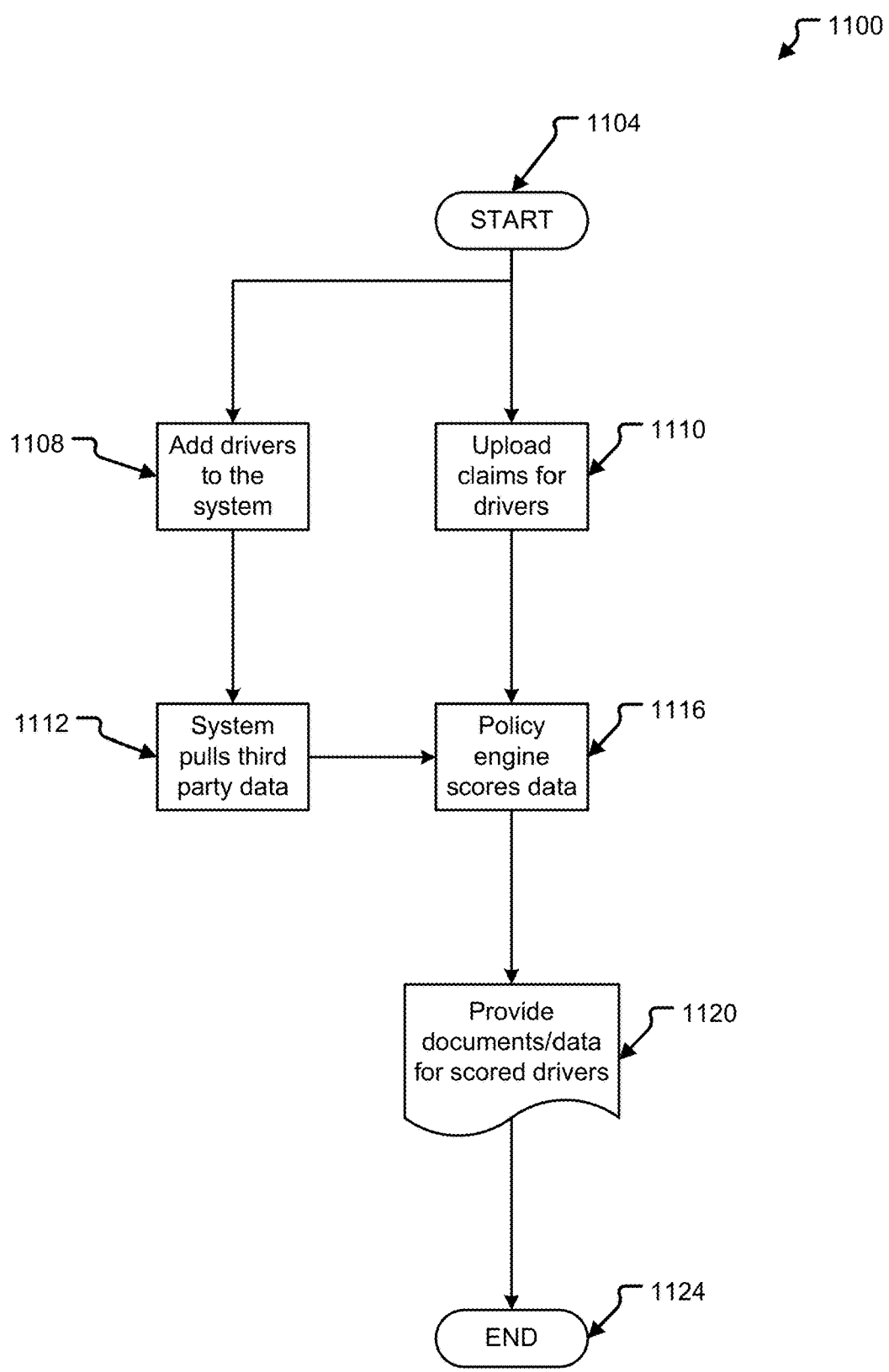
FIG. 11 depicts a method for generating policy scores in accordance with examples of the present disclosure.

FIG. 11 shows a method 1100 for making policy scores available to one or more users in accordance with examples of the present disclosure. A general order for the steps of the method 1100 is shown in FIG. 11. Optionally, the method 1100 starts with a start operation 1104 and ends with an end operation 1124. The method 1100 can include more or fewer steps or can arrange the order of the steps differently than those shown in FIG. 11. The method 1100 can be executed as a set of computer-executable instructions executed by a computer system and encoded or stored on a computer readable medium. Further, the method 1100 can be performed by gates or circuits associated with a processor, an ASIC, a FPGA, a SOC, or other hardware device. Hereinafter, the method 1100 shall be explained with reference to the systems, components, devices, modules, software, signals, data structures, interfaces, methods, etc. described in conjunction with FIGS. 1-10.

The method 1100 may begin at operation 1104 and proceed to operation 1108 where one or more drivers, or individuals, may be added to the system. More specifically, driver data may be uploaded or otherwise provided to the system, at operation 1108. In some instances, and based on the driver data, additional driver information may be pulled from one or more third party sites, such as other motor vehicle offices, compliance, safety and accountability sites, and/or one or more other providers of data as previously discussed, in operation 1112. In some instances, claims data corresponding to one or more drivers may be provided or otherwise received. The claims data may be uploaded as a separate independent operation and/or may be pulled from a third party data source, such as an insurance claims provider, for example, at operation 1112.

At operation 1116, a policy engine may generate a policy score for one or more drivers. As previously depicted and discussed, the policy score may comprise an MVR score and a claims score. The policy score may also take into account policy related information, such as specifics of an organization's driving policy. For example, an organization's driving policy may include an allowed number of accidents within a period of time, a number of driving/traffic infractions within an amount of time, and/or a number of points on a driver's license for instance.

The policy score can be generated by assigning points to each code in an MVR and/or other driver information (e.g., State Court records, crash data, CSA information, insurance records, etc.) to determine a driver risk score. The MVR score may be one component of the policy score. Codes may be standard across all normalized data. Thus, after mapping violations or events to standard codes, those codes may then receive standard point values. These point values, attributed to one or more events in the driver's profile, may then be added together to create the policy score. It is possible that a user may change the policy score by changing how certain codes are computed. This unique and user-specific policy information may be input to the policy engine 316 to change the scoring. However, the policy engine 316 can produce standardized point values across all types of drivers and States and can provide the point values to score driver risk.

At 1120, the policy score may be individually provided for each driver and/or aggregated for an organizational policy score. The policy score may be presented in user interfaces, as shown in FIGS. 6-9. The method 1100 may end at 1124.

Figure 12:
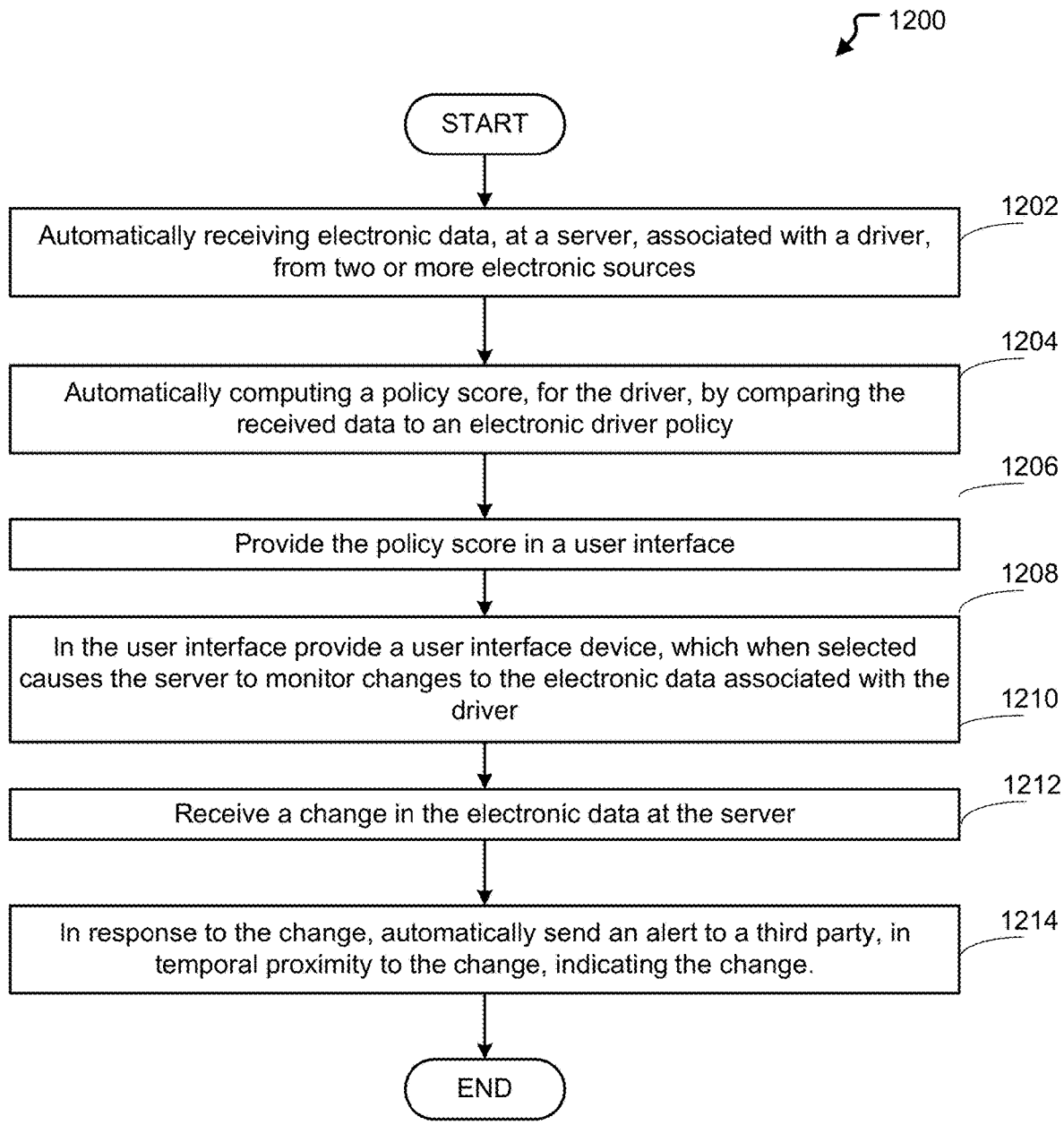
FIG. 12 depicts a method for displaying, in a user interface, policy scores associated with a driver in accordance with examples of the present disclosure.

FIG. 12 shows a method 1200 for changing policy scores available for one or more drivers in accordance with examples of the present disclosure. A general order for the steps of the method 1200 is shown in FIG. 12. Optionally, the method 1200 starts with a start operation 1204 and ends with an end operation. The method 1200 can include more or fewer steps or can arrange the order of the steps differently than those shown in FIG. 12. The method 1200 can be executed as a set of computer-executable instructions executed by a computer system and encoded or stored on a computer readable medium. Further, the method 1200 can be performed by gates or circuits associated with a processor, an ASIC, a FPGA, a SOC, or other hardware device. Hereinafter, the method 1200 shall be explained with reference to the systems, components, devices, modules, software, signals, data structures, interfaces, methods, etc. described in conjunction with FIGS. 1-11.

The safety system, e.g., the server 104, can receive electronic data associated with the driver from two or more electronic sources, for example, the vehicle information 108, state motor vehicle systems 112, state court systems 116, in operation 1202. The data received may be as shown in data structures 504, 528. The data can include drivers' license information 508, the driver ID 510, the state from which the driver information was obtained 512, biographical data 516, data sources 532, policy scores 536, etc. The biographical data 516 can include information about the drivers' performance or record. The driver performance information may be provided to the policy engine 316.

The policy engine 316 can then automatically compute a policy score for the driver by comparing the received data to an electronic driver policy, in operation 1204. First, the driver data received in data structure 504 must be normalized. In this way, data from different states may be put into a common format for processing. Thus, the type or source of the data presented in the state records is transformed and put into similar database records/fields. Further, data from the customer may be received and stored in data stores 312, 118. The normalized data, in data store 328, and the driver provided data from data stores 320, 118 may be retrieved or read by the policy engine 316. This data may then be evaluated based on one or more customer defined policy rules 324. These policy rules include information or algorithms used to determine a policy score for the driver. One or more of the data items receives a point scored based on the policy rules. For example, if the driver has two or more accidents in the most recent past 16 months, the customer defined policy rules, in data 312, may indicate that that driver should receive a policy score of 25. There may be more or fewer policy rules applied by the policy engine 316.

The determined policy score generated by the policy engine 316 may then be display in a user interface, for example, the policy score user interface 704 and/or in the driver performance report 802, in operation 1206. In user interface 602, the data from two or more of the policy scores can be consolidated into consolidated data used to generate the visual indicia, e.g., the pie charts, shown in FIG. 6. User interfaces 602 and 702 can provide information about two or more drivers.

In the driver report 802, the user interface can provide a user interface device 824, which when selected can cause the server 104 to monitor changes in the electronic data associated with the driver in data storage 108, 112, 116, in operation 1208. In one example, the server 104 may poll data at each of the servers 108-116, associated with the driver. In other configurations, the data sources 108 through 116 may push data changes to the server 104. In still another implementation, the server 104 may subscribe to changes for any driver being monitored by the server 104. Then, only changes to the subscribed drivers' records are provided. In still another implementation, all changes to all drivers in data sources 108-116 are provided to the server 104 periodically, e.g., daily weekly, monthly, etc. The server 104 may then search the provided data for the monitored drivers.

Regardless of the method for obtaining the changes, the server 104 can receive a change in the electronic data, in operation 1210.

In response to the change in data, the server 104 can automatically send an alert to a third party, in operation 1212. The alert can be a visual indication of a change in one of the reports 802, 702, etc. In other examples, the server 104 may send a banner message or other type of communication to an email, text, application, etc. associated with the customer desiring to monitor the driver. In still other examples, the alert can automatically change the ability for the driver to access motor vehicles or physical sites. For example, the alert may prevent the driver from unlocking a vehicle with a near-field communication device by sending the alert to the vehicle normally used by that driver and automatically prohibiting entry. In another example, the alert may prevent a door or gate from unlocking, with a radio frequency ID (RFID) or similar device, prohibiting the user from accessing vehicle(s) stored in some facility.

The alert may be sent in temporal proximity to the change in the data. In other words, the alert may be sent in real-time or near real-time to the change in data. Thus, the alert may be sent within a second, a minute, etc. from the change in data. In this way, the third party may be alerted quickly to address issues with the monitored driver. The alert can also indicate the type of change. For example, the alert can indicate that the driver has had an accident, has been issued a ticket, or has had some other violation which would change his/her policy score and cause the driver to be unfit to operate a motor vehicle. In this way, the system 100 is operable to make real time changes to driver conduct based on changes to the driver's information stored in a plurality of various sources.

Figure 13:
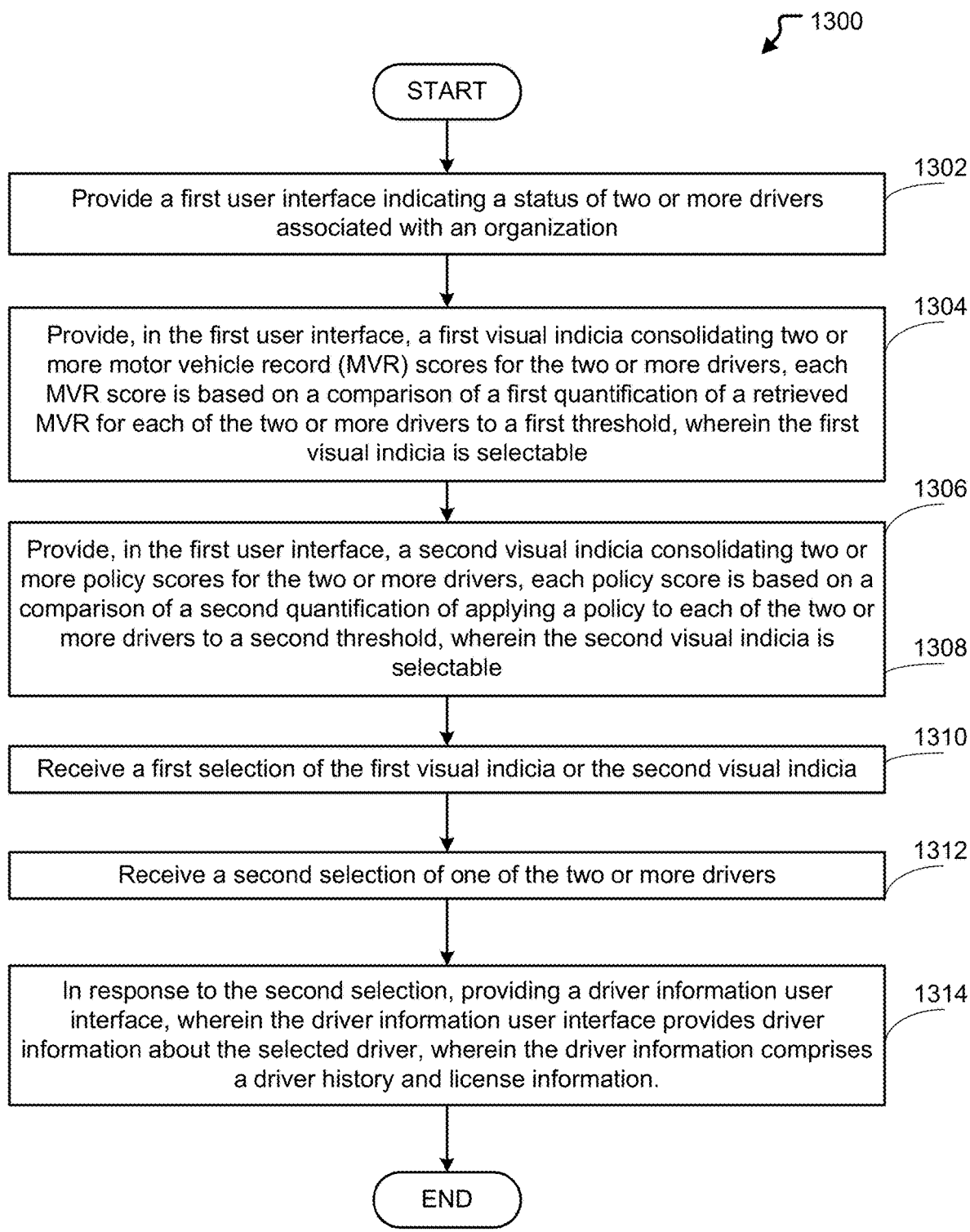
FIG. 13 depicts a method for displaying driver information, in a user interface, in accordance with examples of the present disclosure.

FIG. 13 shows a method 1300 for displaying policy scores available to one or more users in accordance with examples of the present disclosure. A general order for the steps of the method 1300 is shown in FIG. 13. Optionally, the method 1300 starts with a start operation 1304 and ends with an end operation. The method 1300 can include more or fewer steps or can arrange the order of the steps differently than those shown in FIG. 13. The method 1300 can be executed as a set of computer-executable instructions executed by a computer system and encoded or stored on a computer readable medium. Further, the method 1300 can be performed by gates or circuits associated with a processor, an ASIC, a FPGA, a SOC, or other hardware device. Hereinafter, the method 1300 shall be explained with reference to the systems, components, devices, modules, software, signals, data structures, interfaces, methods, etc. described in conjunction with FIGS. 1-12.

The platform 314 can provide a first user interface indicating a status of two or more drivers associated with an organization, in operation 1302. The first user interface may be the same or similar to the score dashboard 602, shown in FIG. 6. The score dashboard 602 can include information about MVR score(s) 608 and policy score(s) 612. Thus, the platform 314 can provide in the first user interface 602 a first visual indicia 608 consolidating two or more motor vehicle record scores for two or more drivers. Each MVR score associated with the driver is based on a comparison of a quantification of the retrieved MVR to a first threshold. In other words, the policy engine 316 can determine MVR score based on data within the MVR. The MVRs may be scored based on the standardized point values, as described herein.

The score can indicate a number of points assigned to negative conditions within the driver's MVR profile. This MVR score is then compared to a threshold. If the score is above the threshold, the driver is considered a risk. Risky drivers are presented with a predetermined type of visual indicia. For example, a driver with a risk score that is above the threshold may be indicated by the color red in the user interface. In other situations, drivers that are low risk may be provided a different visual indicia, for example, the color green. Other color or other types of indicia are possible to indicate other types of drivers and their risk profile. The various driver risk profiles may then be organized into a consolidated visual indicia 608, for example, the pie chart shown in user interface 602.

The policy engine 316 can also provide in the first user interface 602, a second in visual indicia 612 that consolidates two or more policy scores for two or more drivers. Similar to the MVR score, the policy score is based on a comparison of a second quantification of applying a policy to each of the two or more drivers and comparing those scores to a second threshold. Thus, the user may also be given a score based on the number of policy violations assigned to that driver based on the driver profile. A policy violation is any type of rule violation per the rules establish within the policy. For example, the driver policy may indicate that having a traffic ticket is a violation and may assign a certain number of points for that violation. In another example, a driver may be assigned a more significant number of points based on a crash occurring while the driver is using motor vehicle. Summer to the MVR scores in the visual indicia 608, the policy score can also present different visual indicia to different type of drivers with different type risk profiles and then consolidate that information into a chart or other type of display 612.

A user may use a user selection device, for example a cursor or other type of device to interact with the user interface, to select one or more the visual indicia in user interface 602. For example, the user interface 602 can receive a first selection of the first visual indicia 608 or the second visual indicia 612 by interaction with the user input device, in operation 1308. Upon receiving the selection of the visual indicia 608, 612, the policy engine 316 may display a policy score report or other type of user interface 704. The drivers that form the consolidation of MVR or policy score(s) shown in visual indicia 608, 612 may now be listed individually in user interface 704. The user interface 704 may list the drivers based on how risky those drivers are. For example, the drivers may be listed in chronological order from riskiest driver, based on policy score 708, to least risky driver. In other examples, the drivers may be listed in chronological order based on the MVR score 712. At least some data within the display 704 associated with each driver may be selectable. For example, the driver name may be selectable in user interface 704.

The driver evaluation platform 314 can receive a selection of information in the policy score report 704. This selection may indicate one of the two or more drivers in which the user desires more information, in operation 1310. For example, the user may select a link associated with the name of the driver in the policy score report 704. In response to the selection of the driver, the driver evaluation platform 314 can provide a driver information user interface 802, in operation 1312. The driver information user interface 802 can provide driver information about that specific driver. The driver information can comprise a driver history, license information, driver score information, or other types of data associated with the driver. In the activity history, one or more of the events that caused the high policy score may be shown. This information can include accidents, speeding violations, and other types of events. In this way, it is possible to ascertain from the event history why the driver received the policy score shown in portion 813.

Figure 14A:
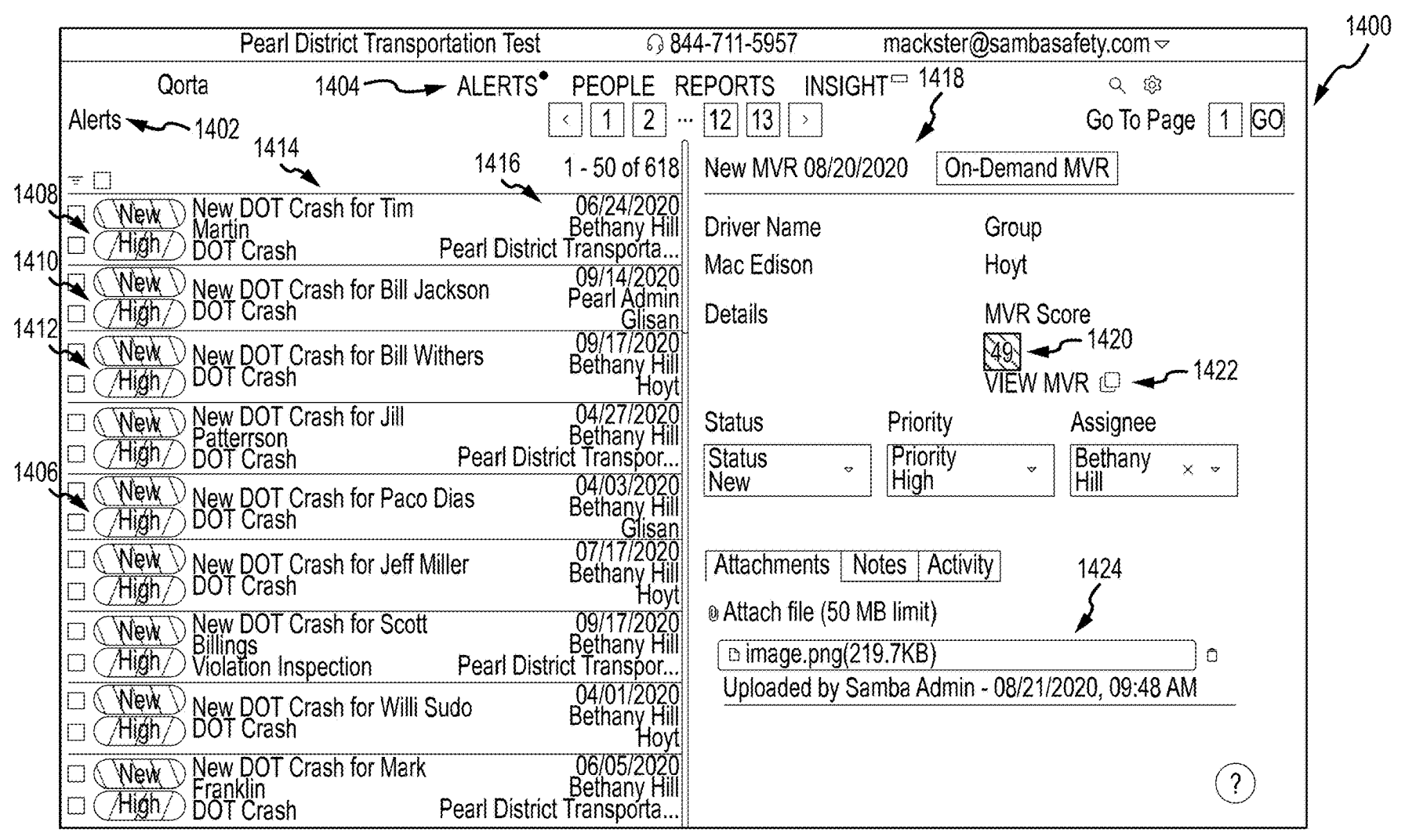

An example user interface 1400 that provides alerts to a user may be as shown in FIG. 14A. The user interface 1400 can include alerts or indicate that alerts are provided in the display, as indicated by the banner 1402. The alerts user interface 1400 may be automatically provided upon the user providing some interaction, for example, starting the application or logging into the application. In other implementations, the user may check alerts by selecting a user selectable device 1404 to be provided window 1400.

There may be a column or set of alerts in section 1406. The alerts may be provided as a set of data 1408, 1410, and 1412. Each alert can provide visual indicia indicating the status of the alert and how important the alert is, e.g., the red color indicates a high importance alert. Further, as an example, the alert may state that the alert is "new" and that the importance is high. Each alert may include what type of alert is being provided, in portion 1414, the date of the alert, and/or other information associated with the alert, in portion 1416. An alert may be selected, by a user interface device, to provide more information about the alert, in portion 1418. This information 1418 may include the driver biographical information, the MVR score 1420, a user-selectable device selected to view an MVR 1422, and other information. Thus, the user can review what changed in the MVR that caused the alert. Other information may be attached as attachment 1424. This attachment information 1424 may also be an image of a traffic citation, accident report, vehicle inspection or some other type of data.

Other types of alerts may be provided in the user interface 1426, as shown in FIG. 14B. As with user interface 1400, user interface 1426 can provide one or more alerts in portion 1428. Each alert may have a set of data as provided in example section 1430. For user interface 1426, the alerts are associated with CSA inspections. Thus, visual indicia 432 may indicate the type of alert, while portion 1434 can indicate what type of alert is being provided. For example, portion 1434 can indicate that the driver's vehicle underwent a new inspection on an indicated date and that there was a violation during the inspection. By selecting the alert, more information may be provided, in portion 1436. For example, biographical information about the driver may be provided along with an indication of what the violation was, in portion 1438. Further, actions and other information may be provided in section 1440 to allow for further investigation of the inspection. Further, the user may be able to select an image or information about the inspection report by selecting a user selectable device 1442.

When the user's selects the user selectable device 1442, the inspection details may be provided, in a user interface 1444, as shown in FIG. 14 C. In user interface 1444, the driver name may be as shown in portion 1446 while inspection details are provided in portion 1448. Inspection details 1448 can include the date of the inspection, the type of inspection, where the inspection was conducted, etc. The type of vehicle or violation information that caused the alert may be provided in portion 1450. Portion 1450 can indicate the type of violation, a description of the violation, and other information as shown in portion 1450.

Figure 14D:
FIG. 14D depicts a graphical user interface for providing driver and/or organization information in accordance with examples of the present disclosure.

If the user selects user selectable device 1422, the user may be provided with user interface 1452, which provides an MVR for that driver, as shown in FIG. 14D. The MVR can include an indication of which driver is associated with the MVR in banner 1454. Biographical information about the driver may be provided in portion 1456. Any violations, convictions, or events associated with the driver may be provided in portion 1458. These violations can include crashes, tickets, or other events. The MVR data may be provided to allow the user to determine why the alert was provided and have the ability to address such violations or issues with the driver.

The foregoing systems and methods provide advantages to manage commercial fleets. The volume of data stored within State DMVs and State court records is not possible to access or monitor without electronic systems. However, accessing electronic data requires numerous types of connections, retrieval protocols, and data formats. Thus, the only methods available to evaluate the data is through electronic data retrieval and normalization. The systems and methods herein provide the technical benefit of ingesting the electronic data, normalizing the data, evaluating the data across the different States, and providing the data in a common format/form for output. Thus, the systems and methods herein provide for accessing and applying the data to allow for extraction of information about numerous drivers. The systems and methods also allow for a standardized format for the data for evaluating the risk of those drivers and being able to address situations with risks presented by drivers.

The systems and methods also provide for monitoring of changes to the drivers, which would not be possible based on the large amount of driver information. Further, the systems and methods allow for the timely reaction to any changes in driver data that would not be possible if manual review of such data was required. In other words, timeliness is important to ensure the mitigation of risk from drivers that are driving recklessly and that may cause accidents or other types of problems for an employer. Understanding how those drivers react or act and then being able to address situations with those drivers that are likely to cause accidents or other problems is important for the ability to mitigate risk or other harm to organizations that have driver fleets.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an example that is entirely hardware, an example that is entirely software (including firmware, resident software, microcode, etc.) or an example combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

Aspects of the present disclosure include a method comprising: automatically receiving, by a server, electronic data associated with a driver, from two or more electronic sources; automatically computing, by the server, a policy score, for the driver, by comparing the received data to an electronic driver policy; providing, by the server, the policy score in a user interface; in the user interface, providing a user interface device, which when selected causes the server to monitor changes to the electronic data associated with the driver; receiving a change in the electronic data at the server; and in response to the change, automatically sending an alert to a third party, in temporal proximity to the change, indicating the change.

Any of the one or more above aspects, wherein at least one source is driver motor vehicle records.

Any of the one or more above aspects, wherein at least one source is insurance company records.

Any of the one or more above aspects, wherein the policy score is compared to a threshold.

Any of the one or more above aspects, wherein based on the comparison, a visual indicator is provided in the user interface to indicate whether the driver is in compliance with the driver policy.

Any of the one or more above aspects, wherein the policy score for the driver is consolidated with at least one other policy score from a second driver into consolidate data.

Any of the one or more above aspects, wherein the consolidated data is displayed in a second user interface to show status of at least two drivers.

Any of the one or more above aspects, wherein the two or more sources are monitored to find the change in the data.

Any of the one or more above aspects, wherein the policy score is updated based on the change found in at least one of the two or more sources.

Any of the one or more above aspects, wherein the alert indicates the update to the policy score.

Any of the one or more above aspects, wherein the alert automatically prohibits access, by the driver, to a vehicle or physical site.

Aspects of the present disclosure include a method comprising: providing a first user interface indicating a status of two or more drivers associated with an organization; providing, in the first user interface, a first visual indicia consolidating two or more motor vehicle record (MVR) scores for the two or more drivers, each MVR score is based on a comparison of a first quantification of a retrieved MVR for each of the two or more drivers, to a first threshold, wherein the first visual indicia is selectable; providing, in the first user interface, a second visual indicia consolidating two or more policy scores for the two or more drivers, each policy score is based on a comparison of a second quantification, of applying a policy to each of the two or more drivers, to a second threshold, wherein the second visual indicia is selectable; receiving a first selection of the first visual indicia or the second visual indicia; and providing a policy score report user interface, the policy score report user interface provides an identity of the two or more drivers, the two or more drivers are organized by the driver's policy score, a third visual indicia associated with each of the driver's policy score indicates whether the driver is in compliance with the policy.

Any of the one or more above aspects, wherein the drivers are selectable, and wherein method further comprises: receiving a second selection of one of the two or more drivers; and in response to the second selection, providing a driver information user interface, wherein the driver information user interface provides driver information about the selected driver, wherein the driver information comprises a driver history and license information.

Any of the one or more above aspects, wherein driver information comprises a driver score summary indicating how the policy score associated with the driver was computed.

Any of the one or more above aspects, the driver information user interface further comprises a selectable monitoring user interface device, the method further comprises: receiving a third selection on the selectable monitoring user interface device; and in response to the third selection, monitoring electronic data associated with the driver for changes.

Any of the one or more above aspects, further comprising: receiving a change in the electronic data; and in response to the change, automatically sending an alert to a third party, in temporal proximity to the change, indicating the change.

Any of the one or more above aspects, the policy score report user interface ranks the two or more drivers based first on the driver's policy score then on the driver's MVR score.

Any of the one or more above aspects, the policy score report user interface displays a fourth visual indicia indicating a result of a comparison of the driver's policy score, associated with the driver, to a threshold.

Any of the one or more above aspects, the driver history is selectable, the method further comprises: receiving a fourth selection on the driver history; and in response to the fourth selection, displaying an accident had by the driver.

Aspects of the present disclosure include a method comprising: providing a first user interface indicating a status of two or more drivers associated with an organization; providing, in the first user interface, a first visual indicia consolidating two or more motor vehicle record (MVR) scores for the two or more drivers, each MVR score is based on a comparison of a first quantification, of a retrieved MVR for each of the two or more drivers, to a first threshold, wherein the first visual indicia is selectable; providing, in the first user interface, a second visual indicia consolidating two or more policy scores for the two or more drivers, each policy score is based on a comparison of a second quantification, of applying a policy to each of the two or more drivers, to a second threshold, wherein the second visual indicia is selectable; receiving a first selection of the first visual indicia or the second visual indicia; providing a policy score report user interface, the policy score report user interface provides an identity of the two or more drivers, the two or more drivers are organized by the driver's policy score, a third visual indicia associated with each of the driver's policy score indicates whether the driver is in compliance with the policy, wherein the drivers are selectable; receiving a second selection of one of the two or more drivers; and in response to the second selection, providing a driver information user interface, wherein the driver information user interface provides driver information about the selected driver, wherein the driver information comprises a driver history and license information.

Aspects of the present disclosure include any of the one or more above aspects in combination with any of the other one or more above aspects;

Aspects of the present disclosure include a means for any of the one or more above aspects.

Aspects of the present disclosure include an ASIC, FPGA, System-on-Chip (SOC) for performing any of the one or more above aspects.

What is claimed is:

1. A method comprising:
automatically receiving, by a server, electronic data associated with a driver, from two or more electronic sources;
automatically computing, by the server, a policy score, for the driver, by comparing the received data to an electronically-stored driver policy;
providing, by the server, the policy score in a user interface;
in the user interface, providing a graphical element, which when selected causes the server to monitor the electronic data for changes associated with the driver;
receiving a selection of the graphical element to initiate monitoring of the electronic data;
receiving a change in the electronic data at the server;
recomputing, by the server, the policy score;
comparing, by the server, the recomputed policy score to a threshold, wherein the recomputed policy score crosses the threshold; and
in response to the recomputed policy score crossing the threshold, automatically sending, by the server, in temporal proximity to the change, an alert signal to a vehicle used by the driver or to a physical access gate, wherein the alert signal prevents the driver from unlocking, using a near field communication device, either the vehicle, or a the physical access gate.

2. The method of claim 1, wherein a first source of the two or more electronic sources is driver motor vehicle records.

3. The method of claim 2, wherein a second source of the two or more electronic sources is insurance company records.

4. The method of claim 3, wherein the near field communication device is a Radio Frequency Identification (RFID) device or a mobile device.

5. The method of claim 4, wherein based on the comparison, a visual indicator is provided in the user interface to indicate whether the driver is in compliance with the driver policy.

6. The method of claim 5, wherein the policy score for the driver is consolidated with at least one other policy score from a second driver into consolidated data.

7. The method of claim 6, wherein the consolidated data is displayed in a second user interface to show status of at least two drivers.

8. The method of claim 7, wherein the two or more electronic sources are monitored to find the change in the electronic data.

9. The method of claim 8, wherein the policy score is recomputed based on the change in the electronic data found in the first source or the second source.

10. The method of claim 9, further comprising: sending an alert to a third party device, wherein the alert indicates the recomputed policy score.

11. The method of claim 10, wherein the alert includes a change to a user interface of the third-party device that indicates the recomputed policy score.

* * * * *